(12) United States Patent
Juels et al.

(10) Patent No.: US 7,197,639 B1
(45) Date of Patent: Mar. 27, 2007

(54) CRYPTOGRAPHIC COUNTERMEASURES AGAINST CONNECTION DEPLETION ATTACKS

(75) Inventors: Ari Juels, Brookline, MA (US); John Brainard, Sudbury, MA (US)

(73) Assignee: RSA Security Inc., Bedford, MA (US)

( * ) Notice: Subject to any disclaimer, the term of this patent is extended or adjusted under 35 U.S.C. 154(b) by 0 days.

(21) Appl. No.: 09/496,824

(22) Filed: Feb. 2, 2000

Related U.S. Application Data

(60) Provisional application No. 60/118,754, filed on Feb. 5, 1999.

(51) Int. Cl.
*H04L 9/00* (2006.01)

(52) U.S. Cl. .......... 713/168; 713/171; 713/173; 713/169; 726/7; 726/14; 380/44; 380/277

(58) Field of Classification Search ........... 713/201
See application file for complete search history.

(56) References Cited

U.S. PATENT DOCUMENTS

| | | | | |
|---|---|---|---|---|
| 5,243,596 A | * | 9/1993 | Port et al. ................ | 370/231 |
| 5,602,917 A | * | 2/1997 | Mueller .................... | 380/284 |
| 5,724,425 A | * | 3/1998 | Chang et al. .............. | 705/52 |
| 5,748,740 A | * | 5/1998 | Curry et al. .............. | 705/65 |
| 5,826,014 A | * | 10/1998 | Coley et al. .............. | 713/201 |
| 5,864,683 A | * | 1/1999 | Boebert et al. ............ | 709/249 |
| 5,935,246 A | * | 8/1999 | Benson .................... | 713/200 |
| 6,049,774 A | * | 4/2000 | Roy ....................... | 705/8 |
| 6,061,798 A | * | 5/2000 | Coley et al. .............. | 713/201 |
| 6,105,133 A | * | 8/2000 | Fielder et al. ............ | 713/169 |
| 6,185,689 B1 | * | 2/2001 | Todd et al. ............... | 713/201 |
| 6,199,181 B1 | * | 3/2001 | Rechef et al. ............. | 714/38 |
| 6,301,584 B1 | * | 10/2001 | Ranger .................... | 707/103 R |
| 6,389,532 B1 | * | 5/2002 | Gupta et al. .............. | 713/163 |
| 6,480,957 B1 | * | 11/2002 | Liao et al. ............... | 713/170 |
| 6,516,416 B2 | * | 2/2003 | Gregg et al. .............. | 713/201 |
| 6,529,487 B1 | * | 3/2003 | Rose ...................... | 370/328 |

OTHER PUBLICATIONS

Merkle, R C, "Secure Communication Over Insecure Channels" ACM Publication, Communication of the ACM, Apr. 1978, vol. 21 No. 4, pp. 294-299.*

Millen, Jonathan k; "A Resource Allocation Model for Denial of Service"; The MITRE Corporation; IEEE Publication 0-8186-2825-1; 1992.*

J. Markoff, "A New Method of Internet Sabotage Is Spreading", *The New York Times*, Sep. 19, 1996, pp. 3-5.

R. Aguilar and J. Kornblum, "*New York Times* site hacked", CNET NEWS.COM, Nov. 8, 1996, 3 pages.

(Continued)

*Primary Examiner*—Syed A. Zia
(74) *Attorney, Agent, or Firm*—Wilmer Cutler Pickering Hale and Dorr LLP

(57) ABSTRACT

This invention relates to cryptographic communications methods and systems that protect a server from a connection depletion attack. Specifically, the invention presents a method for allocating a resource comprising the steps of receiving a resource allocation request from a client, imposing a computational task and a time limit for correct completion of the task upon the client, verifying that the task was performed correctly within the time limit, and allocating the resource if the task was correctly performed within the time limit.

55 Claims, 10 Drawing Sheets

OTHER PUBLICATIONS

R. Braden, "T/TCP: TCP extensions for transactions functional specification", Jul. 1994, RFC 1644, Internet Activities Board, 27 pages.

CERT, *Advisory CA-96.21: TCP SYN flooding and IP Spoofing attacks*, Sep. 19, 1996, 9 pages.

Daemon9, Project Neptune, *Phrack Magazine*, 48(7):File 13 of 18, Jul. 1996, available at www.fc.net/phrack/files/p48/p48-13.html, 24 pages.

DARPA, *Transmission control protocol (TCP) DARPA Internet program protocol specification*, Sep. 1981, available at www.cis.ohio-state.edu/htbin/rfc/rfc793.html, 83 pages.

Digital Equipment Corporation, "Performance Tuning Tips for Digital Unix", Jun. 1996, available at www.apache.05/docs/misc/perf-dec.html, 4 pages.

H. Dobbertin, "Cryptanalysis of MD4", in D. Grollman, editor, *Fast Software Encryption: Third International Workshop*, pp. 53-69, Springer-Verlag, 1996, Lecture Notes in Computer Science No. 1039.

C. Dwork et al., "Pricing via processing or combatting junk mail", in E.F. Brickell, editor, *Proc. CRYPTO 92*, pp. 139-147, Springer-Verlag, Aug. 1992, Lecture Notes in Computer Science No. 740.

M.K. Franklin et al., "Auditable metering with lightweight security", in R. Hirschfeld, editor, *Proc. Financial Cryptography 97 (FC97)*, pp. 151-160, Springer-Verlag, 1997, Lecture Notes in Computer Science No. 1318.

A. Freier et al., The SSL Protocol, Version 3.0, http://home.netscape.com/eng/ssl3/3-SPEC.htm, Mar. 1996, pp. 1-26, and Table of Contents, http://home.netscape.com/eng/ssl3/ssl-toc.html, pp. 1-3.

P. Karn et al., Photuris: Session key management protocol, I-D draft-ietf-ipsec-photuris-08.txt, work in progress, Mar. 1999, http://sunsite.auc.dk/RFC/rfc/rfc2522.html, 81 pages.

D. Maughan et al., Internet security association and key management protocol (ISAKMP), Technical report (IETF, Mar. 1998, http://www.vpnc.org/ietf-ipsec/98.ipsec/msg00518.html, 78 pages.

C. McDiarmid, "On the method of bounded differences", in *Survey in Combinatorics*, pp. 148-188, Cambridge University Presss, 1989, London Math. Soc. Lecture Notes Series 141.

R. Rivest et al., "The RC6 block cipher", 1998, presented at the *NIST First AES Candidate Conference*, Ventura, CA., pp. 1-20.

R.L. Rivest, "The MD4 message digest algorithm", in A.J. Menezes and S.A. Vanstone, editors, *Proc. CRYPTO 90*, pp. 303-311, Springer-Verlag, 1991, Lecture Notes in Computer Science No. 537.

R.L. Rivest, The MD4 Message-Digest Algorithm, Apr. 1992, RFC 1320, Internet Activities Board, http://www.faqs.org/rfcs/rfc1320.html, 16 pages.

R.L. Rivest et al., "Time-lock puzzles and timed-release crypto", MIT Laboratory for Computer Science Manuscript, revised Mar. 10, 1996, pp. 1-9.

The Standard Performance Evaluation Corporation, *SpecWeb96 Results*, 1998, available at http://www.spec.org/osg/web96/results/, 2 pages.

B. Ziegler, "Savy Hacker tangles Panix Web site", *Wall Street Journal*, Sep. 12, 1996, 2 pages.

* cited by examiner

CRYPTOGRAPHIC COUNTERMEASURES AGAINST CONNECTION DEPLETION ATTACKS

REFERENCE TO RELATED APPLICATIONS

This application claims priority to U.S. provisional patent application Ser. No. 60/118,754, entitled "CRYPTOGRAPHIC COUNTERMEASURES AGAINST CONNECTION DEPLETION ATTACKS," filed Feb. 5, 1999, the disclosure of which is hereby incorporated by reference.

FIELD OF THE INVENTION

This invention relates to methods and systems for protecting a server from a communications based denial of service attack, and, in particular, to methods and systems for protecting a server from a connection depletion attack.

BACKGROUND OF THE INVENTION

The Internet has fulfilled much of its early promise of enabling a single computer to service the requests of many millions of geographically dispersed users. In consequence, however, the Internet has introduced security concerns of a new magnitude, making a single computer potentially vulnerable to attack from many millions of sources. Even if a server is effectively protected against intrusive security breaches, it may still be vulnerable to a range of denial-of-service attacks, such as connection depletion attacks. A connection depletion attack is one in which the adversary seeks to initiate, induce server commitment for, and leave unresolved, a large number of connection (or service) requests to a server, possibly exhausting the server's resources and rendering it incapable of servicing legitimate requests. Inducing a server to erroneously commit to a large number of connections can prevent the server from establishing legitimate connections.

TCP SYN flooding is an example of such an attack. Other connection depletion attacks in this same genre include so-called "e-mail bomb" attacks, in which many thousands of e-mail deliveries are directed at a single server target, as well as attacks mounted using high volume read or write traffic via FTP connections with the aim of saturating server storage space or communications bandwidth. Also potentially vulnerable to connection depletion is the SSL (Secure Socket Layer) protocol.

The TCP SYN flooding attack serves as a good example to illustrate some of the issues surrounding connection depletion attacks, as well as some of the proposed defenses. The TCP SYN flooding attack aims to exploit a weakness in the TCP connection establishment protocol whereby a connection may be left "half-open" by the connection-requesting client. The protocol normally proceeds as a three-way handshake. A client requesting a TCP connection with a server begins by sending the server a SYN message. The server commits to establishing the connection by replying to the client by sending a SYN-ACK message, and then prepares the connection by allocating buffer space and initializing any other software required to support the connection. The client completes the protocol by responding with an ACK message. At this point, the connection is established, and service-specific data can be exchanged between client and server.

To mount a TCP SYN flooding attack, the adversary initiates, by soliciting and receiving server commitment to, a large number of connections and then leaves them uncompleted. In other words, the adversary repeatedly fails to send the final ACK message that completes a connection. In essence, the attacking client solicits server commitment without itself ever committing to the completion of a connection. Since the server allocates buffer space when committing to each incomplete connection, the adversary can exhaust server memory designated for TCP requests, thereby causing the server to deny legitimate connection requests.

A number of mechanisms have been proposed to defend against TCP SYN attacks. Most of these are based on one of three different approaches: time-out, random dropping, or "syncookies." The time-out approach discards a half-opened TCP connection after a short period of time if the ACK packet from the client has not been received. While easy to implement in existing TCP servers, this approach can be defeated by an adversary who sends the SYN packets at a rate fast enough to fill the connection buffer. Moreover, a short time-out may be problematic for legitimate users whose network connections have long latency.

In the random dropping approach, half-open connections are discarded at random when the connection buffer reaches a certain percentage of its capacity. This prevents a complete denial of service for all legitimate clients as a group, since the server buffer is never completely full. On the other hand, some legitimate connections are as likely to be discarded as those of an adversary, so substantial degradation in service to legitimate clients may result. This is particularly the case when the adversary is capable of sending service requests at a substantially higher rate than legitimate users, as is possible in such environments as an internal network.

One defense against TCP SYN flooding uses so-called "syncookies." In the syncookie approach, for each client request i, the server sets the sequence number in its SYN/ACK message to a value $V_i$ calculated by hashing various connection parameters with a secret value known only to the server. Only upon receiving an ACK containing $V_i$ from the client making request i does the server allocate resources for the connection. The primary limitation of the syncookie approach is its assumption that an adversary performing IP spoofing will not receive the SYN/ACK message sent to the spoofed address, and therefore will not be able to provide the server with the value $V_i$. This assumption is not always correct, particularly in an internal network, such as an Ethernet, in which intercepting packets is relatively easy. The ISAKMP key management protocol, used in the IETF's IP Security standard, provides for the use of syncookies to defend against TCP SYN attacks.

SUMMARY OF THE INVENTION

The invention provides an apparatus and methods for allocating a server resource on request from a client.

In one embodiment, the invention relates to a method for allocating a resource including the steps of receiving a resource allocation request from a client, imposing a computational task on the client that must be performed within a time limit, receiving verification that the client has correctly performed said computational task within the time limit, and then allocating the resource for the client if the verification is received. In a further embodiment, the resource allocation request includes a network connection request. In another further embodiment, the computational task includes solving a puzzle, an inversion task that could be associated with a one-way hash function or block cipher or other cryptographic processes. In yet a further embodiment, the puzzle includes the output of a one-way function. In another embodiment, the puzzle includes the output of a block cipher. In another embodiment, the puzzle is the output of a function, wherein the input value of the function is generated based at least in part upon the use of a server secret unknown to the client that is not revealed through the correct performance of the computational task. In another embodiment, the puzzle is the output of a function, wherein the input value of the function includes a time stamp and information authenticating a time stamp. This time stamp can be optionally authenticated with the use of a secretly computed message authentication code. In another embodiment, the puzzle is constructed in a stateless or self authenticating fashion. In a further embodiment, the puzzle includes a hash output image and a partially revealed hash input image, or (pre-image). In a further embodiment, the verification includes receiving the remaining unrevealed (hash input image) or pre-image.

In another embodiment, the puzzle includes a plurality of sub-puzzles. In a further embodiment, the sub-puzzles are constructed independently. In an alternate embodiment, the sub-puzzles are constructed with some intended overlap or other relationship between them.

In a further embodiment, the resource allocation request includes a TCP SYN request. In an alternate embodiment, the resource allocation request includes a request to open an SSL connection. In another embodiment, the computational task is selected responsive to at least one characteristic of server's operating circumstances. In another embodiment, the resource allocation request can be accompanied or preceded by a query concerning whether a server is currently imposing computational tasks.

In one embodiment the invention relates to a method for procuring a resource including the steps of communicating a resource allocation request to a server, receiving a computational task from the server, performance of the computational task correctly within a known time limit, and communicating to the server verification that the computational task has been performed correctly within the known time limit. In a further embodiment, the resource allocation request includes a network connection request. In another further embodiment, the method also includes the step of receiving a time limit for completing the computational task from the server. In another further embodiment, the computational task includes solving a puzzle. In yet a further embodiment, the method of solving the puzzle includes a linear search of the solution space associated with the computational task. In a further embodiment, solving the puzzle includes solving a plurality of sub-puzzles. In a further embodiment, the resource allocation request includes a TCP SYN request. In an alternate embodiment, the resource allocation request includes a request to open an SSL connection. In another embodiment, the network allocation request can comprise a query concerning whether a server is currently imposing computational tasks.

In one embodiment, the invention relates to an apparatus for allocating a resource including a first receiver receiving a resource allocation request from a client, a puzzle generator creating a computational task for the client to perform, a transmitter communicating the computational task to the client, a second receiver receiving a verification that the client has correctly performed the computational task within a predetermined time limit, and an allocator allocating resources for the client. In another embodiment, the first receiver and the second receiver include the same receiver. In a further embodiment, the resource allocation request includes a network connection request. In another further embodiment, the transmitter communicates a time limit for completing the computational task to the client. In another further embodiment, the computational task includes solving a puzzle. In yet a further embodiment, the puzzle includes the output of a one-way function. In another embodiment, the puzzle includes the output of a block cipher, namely an encrypted block of text. In another embodiment, the puzzle is the output of a function, wherein the input of the function is generated at least in part upon the use of a server secret that is unknown to the client and is intended to remain unknown after the puzzle is correctly performed. In another embodiment, the puzzle is the output of a function, wherein the input of the function includes a timestamp and information authenticating the timestamp. In another embodiment, the puzzle is constructed in a self authenticating fashion. In a further embodiment, the puzzle includes a hash output image and a partially revealed hash input or pre-image. In a further embodiment, the verification includes verifying the remaining unrevealed input image or pre-image. In another embodiment, the puzzle includes a plurality of sub-puzzles. In a further embodiment, the sub-puzzles are constructed independently. In an alternate embodiment, the sub-puzzles are constructed with some intended overlap. In a further embodiment, the resource allocation request includes a TCP SYN request. In an alternate embodiment, the resource allocation request includes a request to open an SSL connection. In another embodiment, the computational task is selected responsive to a server's operating circumstances. In another embodiment, the resource allocation request can be accompanied or preceded a query concerning whether a server is currently imposing computational tasks. In a further embodiment, the apparatus includes a time limit generator for setting a time limit for which the client must correctly perform the computational task.

In one embodiment the invention relates to an apparatus for procuring a resource that includes a first transmitter sending a resource allocation request to a server, a first receiver receiving a computational task from the server, a computational task solver performing the computational task, and a second transmitter sending to the server a verification that the computational task has been performed. In a further embodiment, the first transmitter and the second transmitter include the same transmitter. In a further embodiment, the resource allocation request includes a network connection request. In another further embodiment, the apparatus also includes a second receiver receiving a time limit for completing the computational task. In a further embodiment, the first receiver and the second receiver include the same receiver. In another further embodiment, the computational task includes solving a puzzle. In yet a further embodiment, the computational task solver performs a linear search of potentially the entire solution space of the computational task. In another embodiment, the computational task includes a solving a plurality of sub-puzzles. In further embodiment, the sub-puzzles are independently constructed. In an alternative embodiment, the sub-puzzles are constructed with some intended overlap. In a further embodiment, the resource allocation request includes a TCP SYN request. In an alternate embodiment, the resource allocation request includes a request to open an SSL connection. In another embodiment, the network allocation request can comprise a query or be accompanied or preceded by a query concerning whether a server is currently imposing computational tasks.

BRIEF DESCRIPTION OF THE DRAWINGS

Embodiments of the invention will be described with reference to the following figures.

DESCRIPTION OF THE INVENTION

Figure 1:
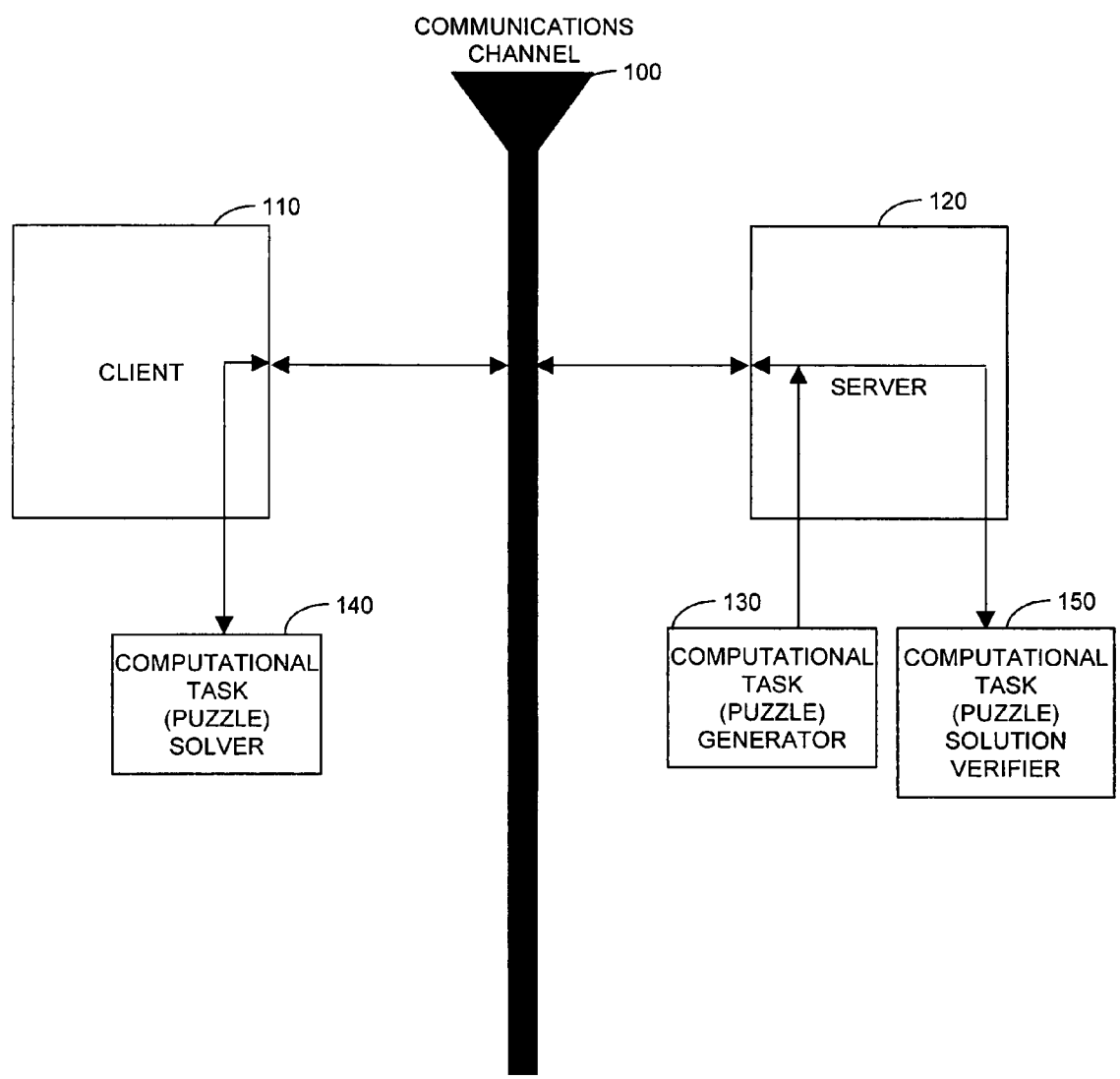
FIG. 1 illustrates client-server communication via a communications channel.

Referring to FIG. 1, a system according to the present invention includes a client 110, a server 120, and a communications channel 100. The client 110 and server 120 communicate by exchanging messages over the communications channel 100. Typically, a server 120 provides one or more resources for access by one or more clients 110. For example, an Internet web server can provide access to its web pages by various Web browsers, acting as clients. For this example, the Internet acts as a communications channel 100.

In one embodiment of the invention, the client 110 and server 120 are implemented as programmable computers. Each of the computers can be a hand held device, or a personal-type computer, a workstation, a server or a mainframe. The computers can, for example, be Intel-based PC or compatible machines, an Apple Macintosh, a Sun workstation, an IBM server, and so on. A computer can be a device that includes a computer, such as a real-time stock quote machine, or the like. The client 110 and server 120 need not be the same kind of computer or device. In general, any device could be used as long as it is able to perform the functions and capabilities described herein. The particular type of computer or workstation is not central to the invention.

The communications channel 100 can be any mechanism that enables communication between any two entities. For example, a communications channel 100 can include a physical connection, such as physical cabling or, alternatively not include a physical connection, such as a wireless communications medium, or may include a combination of both. Further, a communications channel 100 may support any of a number of communications protocols, or signaling methods, including, for example, but not limited to, Ethernet, TCP/IP, ATM, Frame Relay, X.25, or the like.

An exchange of messages between the client 110 and the server 120 over the communications channel 100 is referred to as a session. A session takes place using a pre-determined set of rules of communication between the server 120 and the client 110. Collectively, such a particular set of pre-determined rules is referred to as a communications protocol {M}.

In general, to request a session with the server 120, the client 110 sends a particular protocol message to the server. Upon receiving the request, the server 120 may elect to accept or reject the establishment of a session with the client 110. The election to accept the establishment of a session is also referred to as the establishment of a connection between the client 110 and the server 120. In a network, a connection implies the allocation of client 110 and server 120 resources for the purposes of communication. If the server 120 accepts such a connection request, it is making a commitment to the client 110 to take actions to support such a connection. This commitment by the server 120 may require the server 120 to allocate some of its resources in preparation for a session with the client 110. Server 120 resources are required to be allocated to queue messages received from the client 110, and to track the history and state of the session. Exactly when resources are allocated is based upon the design of the server. In this description, any client message that directly or indirectly requests or causes server resources to be allocated is referred to as a resource allocation request. Also, in this description, any server message communicated in association with the server's allocation of resources in response to a resource allocation request is referred to as an acknowledgement of a resource allocation request. Regardless of what actions are required, such an acknowledgement constitutes a commitment by the server 120 to take action to establish a session with the client 110.

In one embodiment, the server 120 operates in an operating mode, referred to as a defensive mode, in which it imposes a computational task upon the session-requesting client 110 before accepting or rejecting a session request. In this mode, the server 120 only accepts the session request if the client 110 correctly performs the imposed task within a pre-determined period of time set by the server. Otherwise, the server 120 rejects the client's session request.

A computational task generator 130 creates the computational task to be imposed by the server 120 on the client 110. A computational task is a exercise requiring some computational effort to achieve some defined and verifiable result. Such a task can perform useful work, for example, a hash inversion, a prime number search or a Fourier transform, or the task may be a computational exercise. The computational task generator 130 can reside inside or outside the server 120. In one embodiment, the computational task generator 130 is the server 120. The computational task generator 130 may be implemented in software running on another computer. Alternatively, the computational task generator 130 can be implemented in special-purpose hardware. In other words, the server 120 may perform computational task generation or may delegate computational task generation to another entity.

A computational task solver 140 performs the computational task. The computational task solver 140 can reside inside or outside the client. In one embodiment, the computational task solver 140 is the client 110. The computational task solver 140 may be implemented in software running on the client 110 or another computer, or alternatively, is implemented in special-purpose hardware. In other words, the client 110 may perform the computational task or make delegate performance to another entity. Often, however, the computational task solver 140 is the client 110.

The computational task solution verifier 150 verifies that the solution found by the computational task solver 140 is in fact a correct solution to the associated computational task.

The computational task solution verifier 150 can reside inside or outside the server. The computational task solution verifier 150 may be the server 120. The computational task solution verifier 150 may be implemented in software running on the server of another computer. Alternatively, the computational task solution verifier 150 can be implemented in special-purpose hardware. The server 120 can perform the verification or can delegate this functionality to another entity.

In one embodiment, the server 120 also operates in a non-defensive mode. In this non-defensive mode, no task is imposed by the server 120 on a client 110. In one embodiment, the server 120 transitions from a non-defensive mode into a defensive mode of operation depending upon one or more characteristics associated with the server's operating circumstances, for example, based on an assessment of the likelihood of a current or future attack. For example, the status of server resources such as the amount of occupied or unallocated buffer space, or the computational load upon the CPU, can be factors in determining if the server is currently under attack and if the defensive mode of operation is called for. Also, operating circumstances involving the political and economic situation as well as the server's operating environment can be used to assess the likelihood of attack and the benefits of operating in a defensive mode. In one embodiment, a rate of resource allocation greater than a predetermined value, or the total number of connections allocated by the server 120 for clients 110, or both, is used to initiate a defensive mode. Also, the rate of connection buffer allocation and the likely computational capacity of one or more attacking clients 110 can be used to select the computational size of a particular tasks when operating in a defensive mode.

In another embodiment, regardless of the server's operating mode, the client 110 queries the server 120 regarding the status of its operating mode and the server 120 responds to the query message sent by the client 110. This query message is referred to as a server defensive mode query message. In one embodiment, the server 120 responds to the client 110 with one response (e.g., affirmatively) when operating in defensive mode, and with a different response (e.g., negatively) when operating normally. This feature enables a client 110 to inquire about the status of the server's 120 operating mode before deciding whether to request a session with the server 120. If such a request to establish a session is made by the client 110, it is made with the client 110 knowing whether a computational task will be imposed on it by the server 120 as a pre-condition to establishing a session. This query may accompany or precede a resource allocation request.

In another embodiment, a resource allocation request may be parameterized to include a query request. For example, when the client 110 only wishes to allocate a resource if the server 120 is not in a defensive mode, the server 120 will interpret the resource allocation request as a query when the server is in a defensive mode, and not impose any computational tasks nor allocate any resources for the client 110 in response to the resource allocation request.

Figure 2:
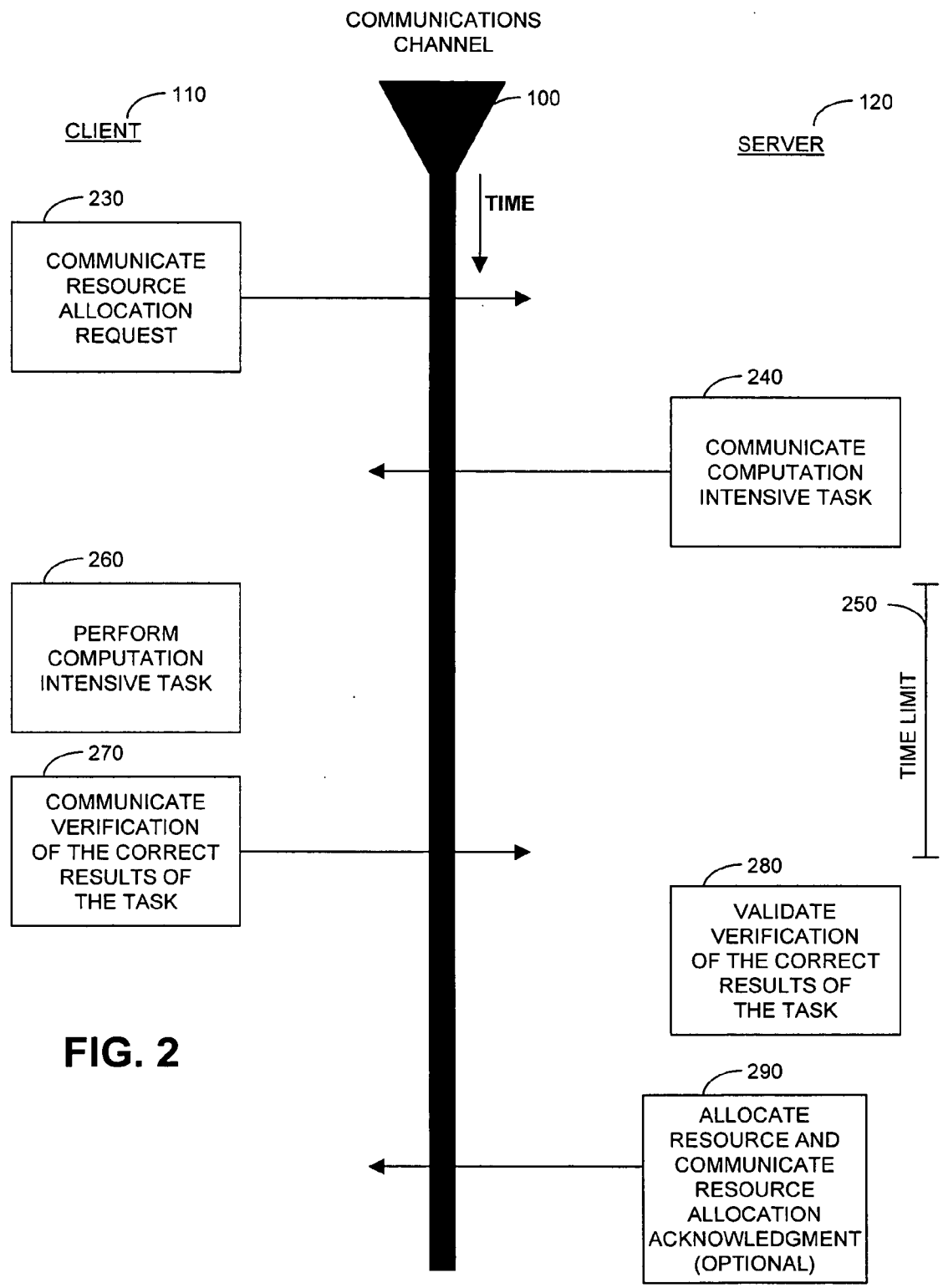
FIG. 2 illustrates an embodiment of the invention wherein the client performs and communicates correct verification of the results of a computationally intensive task.

Referring to FIG. 2, in one embodiment, the client 110 and server 120 interact while the server 120 is operating in a defensive mode. The passage of time is shown from the top to the bottom of the figure. The client 110 communicates a resource allocation request 230 message over the communications channel 100 to the server 120. The server 120 is operating in a defensive mode, and so it communicates a computationally intensive task 240 to the client 110 over the communications channel 100. A pre-determined time limit 250 is used to limit the amount of time that the client has to complete the computationally intensive task 240.

The time limit can be determined by a time limit generator which customizes the time limit to the size of the computational task or the likely computational capacity of an attacking client 110. This time limit 250 may be determined at the time the computationally intensive task 240 is generated or at the time the computationally intensive task 240 is communicated to the client 110. In one embodiment, the time limit generator synchronizes its efforts with the computational task generator 130. The time limit may or may not be known to the client 110. In one embodiment, the time that the computationally intensive task is communicated to the client is included in the task, or in the task solution, so that the server 120 does not have to store the time that the task was sent.

The client 110 performs the computationally intensive task 260 and communicates verification of the correct results of the task 270 to the server. The server 120 then verifies that the task was performed correctly 280 via the computational task solution verifier 150 (FIG. 1) within the time limit 250 known at least to the server 120. The server 120 optionally communicates a (commitment) resource allocation acknowledgement 290 to the client, indicating a commitment to establish a session with the client 110. The server 120 allocates resources associated with the session.

In one embodiment, the client 110 and server 120 communicate using the transmission control protocol ("TCP") protocol. The TCP protocol typically initiates a session with a three-way handshake. In one embodiment, the protocol of FIG. 2 is incorporated into the TCP protocol as follows: A client 110 wishing to initiate a TCP session with a server 120 begins by sending the server 120 a SYN message. This SYN message functions as a resource allocation request 230. The server 120, operating in a defensive mode, communicates a computationally intensive task 240 to the client 110 over the communications channel 100 and determines a deadline time or sets a timer to expire at some pre-determined time limit 250.

The client 110 performs the computationally intensive task 260 and communicates verification of the correct results of the task 270 to the server. The server 120 then validates that the task was performed correctly 280 within the time limit 250 known at least to the server, via the computational task solution verifier 150, and communicates a SYN-ACK message to the client 110. This SYN-ACK message functions as a resource allocation acknowledgement 290 to the client 110, indicating a commitment to establish a session with the client 110. The server 120 allocates resources associated with the session. The client 110 completes the protocol connection by responding to the server 120 with an ACK message (not shown). At this point, the session is established, and further data can be exchanged between client 110 and server 120.

For this example, the SYN message sent by the client 110 constitutes a resource allocation request 230 and the responding SYN-ACK message (optionally) sent by the server 120 constitutes a resource allocation acknowledgement 290 of the resource allocation request 230. An ACK message sent by the client 110 (not shown) completes the protocol connection. The server connection is the resource requested by the client 110. This connection is the link that provides the client 110 access to the server 120.

This protocol that imposes tasks onto clients 110, also referred to as the "client puzzle" protocol, has several advantages over other types of communications attack defenses. The syncookie approach to defending against TCP SYN flooding (and other connection depletion attacks) presumes that an adversary cannot intercept messages sent to spoofed IP addresses. The client puzzle protocol requires no such assumption, and is therefore more useful for defending against internal attacks, and attacks in situations where the adversary can intercept messages sent to spoofed IP addresses. Similarly, the client puzzle protocol is capable of handling attacks attempted to be mounted at very high speeds.

The client puzzle protocol also allows for graceful degradation in service when an attack is mounted. The size of the puzzles can be increased as the progress of an attack advances closer to disabling the server. This enables the protocol to flex according to the scale of the attack. The client puzzle protocol can either be built into the underlying service protocol it is designed to defend, or can be layered onto a higher level protocol. It can also be used in conjunction with dropped connection or other communications attack defense approaches.

In one embodiment, a client 110 that is equipped with a program capable of solving a computational task. Such a program can be built into a browser, made available as a plug-in, or distributed by any one of a variety of other means. In an internal corporate or campus environment, for example, in which software is homogenous or centrally distributed, the distribution can include such a program. It is in this sort of environment that the client puzzle protocol is perhaps most appropriately deployed. Thus, the puzzle solving functionality need not be built into the client 110, and in one embodiment, the client 110 delegates the work of solving the puzzle to another entity.

In determining the usefulness of this protocol, the following assumptions are made regarding an adversary who seeks to mount a resource depletion attack.

The first is that the adversary cannot modify packets sent from any client 110 to the server 120. Any adversary who can modify packets at will can mount a denial-of-service attack simply by corrupting packets. Such an adversary would not need to attack a server 120 by means of resource depletion. If this assumption is slightly altered, to assume that the adversary can modify only a limited number of packets, the client puzzle protocol is still useful.

The second assumption is that the adversary cannot significantly delay packets sent from any client 110 to the server 120. This assumption is made for essentially the same reason as the first. In particular, if an adversary can delay packets arbitrarily, then she can mount a denial-of-service attack without having to overload the server. Again, some relaxation of this assumption is possible. The time-out parameters $T_1$, $T_2$, and $T_3$ in the client puzzle protocol as described below may be adjusted to accommodate possible adversarial delays.

The third assumption is that the adversary cannot saturate the server, the network, or any port. In order for an adversary to mount a connection depletion attack, she must be able to inject a large number of packets into a network. We assume, however, that the adversary cannot disable a server 120 or a port simply by the sheer volume of her requests. In other words, we assume the adversary incapable of sending requests to the server 120 so quickly that the server 120 cannot effectively reject these requests. If the adversary could do so, she would not need to resort to a resource depletion attack.

It is assumed that the adversary can perform IP spoofing. In particular, the adversary can simulate any IP address of its choice in messages sent to the server. IP spoofing is a component of many connection depletion attacks (as well as other denial-of-service attacks). Also, the adversary may be able to read all messages sent over the channel to any IP address. The syncookie approach fails under this possibility, as it means that access to cookies is no longer privileged. Unless packets are encrypted, however, the adversary may have access to all packets on a public network. Generally, this is the case in which an adversary is mounting an attack on an internal network such as an Ethernet. The client puzzle protocol is unaffected by the ability of the adversary to perform IP spoofing or to read messages sent to other IP addresses.

Figure 3:
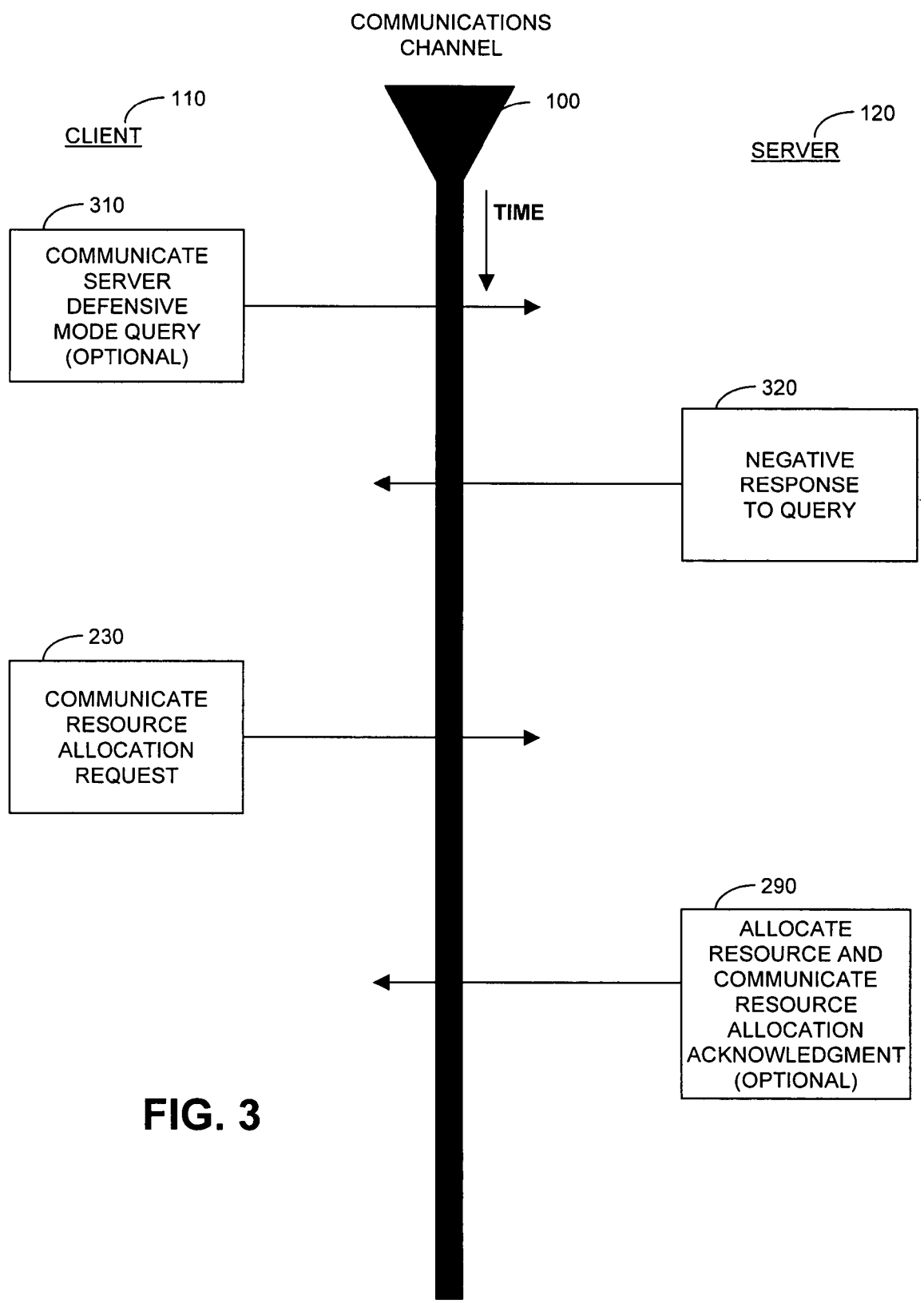
FIG. 3 illustrates an embodiment of the invention wherein the server is not operating in a defensive mode.

Referring to FIG. 3, in one embodiment, the client 110 and server 120 interact while the server 120 is not operating in a defensive mode. In FIG. 3, the passage of time is shown from the top to the bottom of the figure. The client 110 optionally communicates a server mode query message 310 over the communications channel 100 to the server 120. The server 120 responds by sending a query response message 320, to the client 110 that indicates that the server 120 is not operating in the defensive mode. The client 110 communicates a resource allocation request 230 over the communications channel 100 to the server 120. Because the server 120 is not in a defensive mode, the server 120 (optionally) responds by sending an acknowledgement of the resource allocation request 290.

Figure 4:
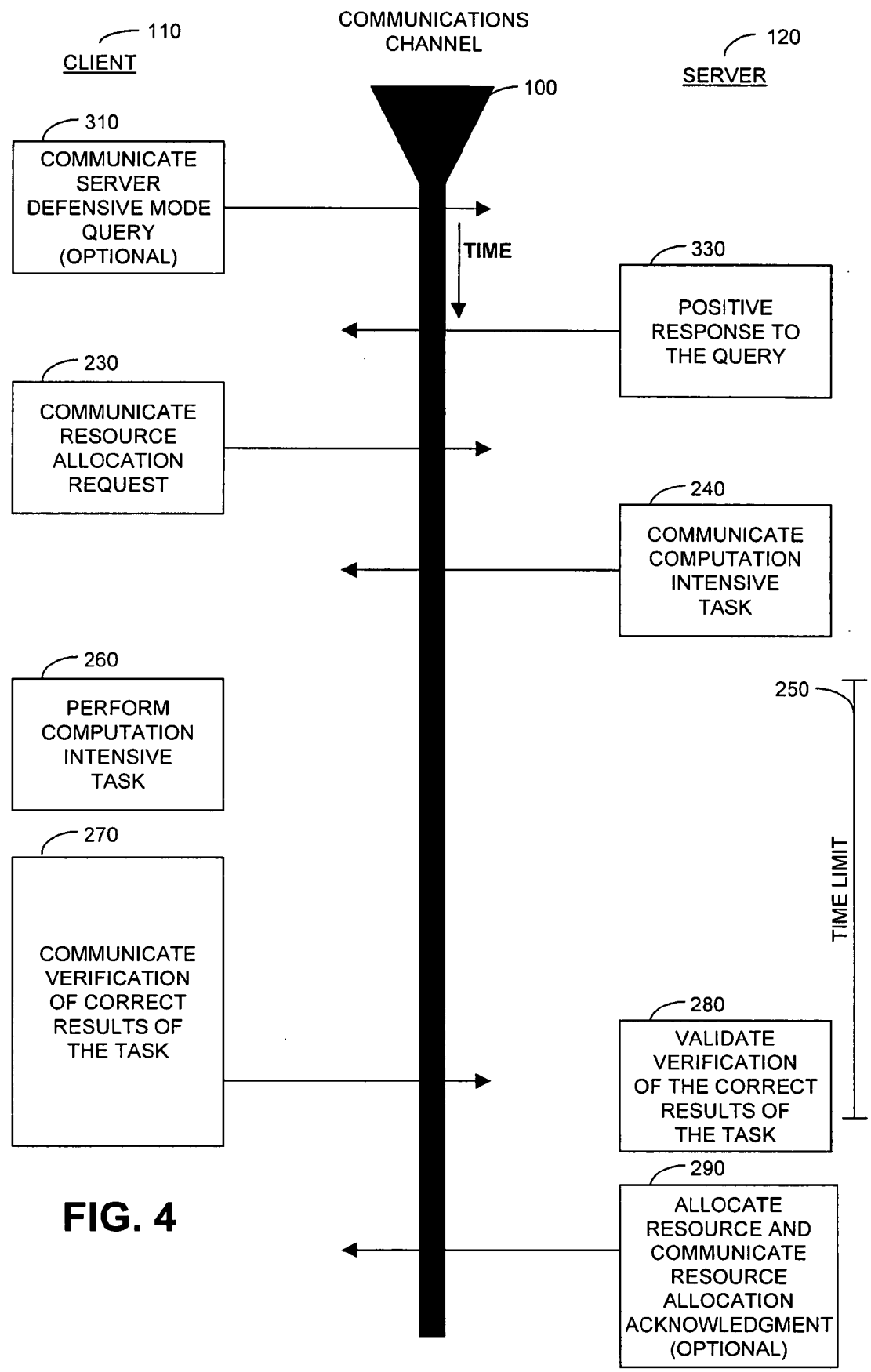
FIG. 4. illustrates an embodiment of the invention wherein the client performs and communicates correct verification of the results of the computationally intensive task.

Referring to FIG. 4, in one embodiment, the client 110 and server 120 interact while the server 120 is in a defensive mode. Again, the passage of time is shown from the top to the bottom of the figure. The client 110 optionally communicates a server defensive mode query message 310 over the communications channel 100 to the server 120. The server 120 responds by sending a query response message 330 to the client 110 which indicates that the server 120 is operating in the defensive mode. The client 110 then communicates a message resource allocation request 230 to the server 120 over the communications channel 100 to the server 120. Note that in this example the client 110 sent the resource allocation request with the understanding that the server 120 would be imposing a computationally intensive task as a pre-condition to allocate the resource. The server 120 communicates a computationally intensive task 240 to the client 110, over the communications channel 100, and records the time for the later determination of the expiration of some pre-determined time limit 250. Such time recording and time limit expiration determination can be implemented in numerous ways. For example, the time of puzzle imposition can stored local to the server 120 and compared with the time that the client 110 later returns an answer to the puzzle to the server 120. Differences between the recorded imposition time and the puzzle answer return time greater than the pre-determined time limit indicates expiration of the puzzle. The client 110 performs the task 260 and communicates verification of the correct results of the task 270 to the server. The server 120 verifies 280 that the task was performed correctly within the time limit 250 via the computational task solution verifier 150 (FIG. 1), and then allocates the resource associated with the resource request 230, and (optionally) communicates an acknowledgement back to the client 290.

Figure 5:
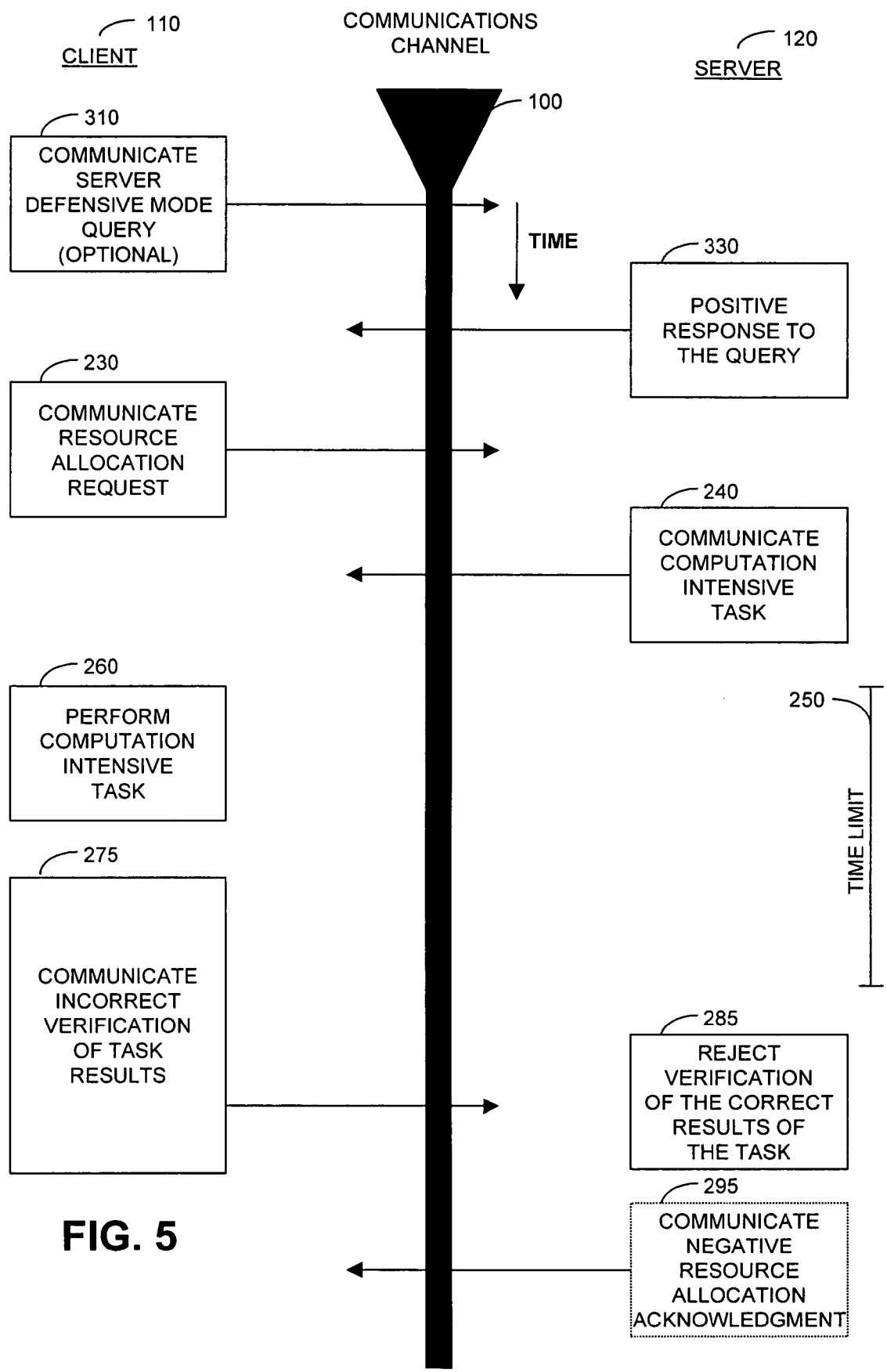
FIG. 5. illustrates an embodiment of the invention wherein the client performs and communicates false verification of the results of the computationally intensive task.

Referring FIG. 5, in another embodiment, the client 110 and server 120 interact while the server 120 is in a defensive mode, with the passage of time shown from the top to the bottom of the figure. The client 110 optionally communicates a server defense mode query message 310 over the communications channel 100 to the server 120. The server 120 responds by sending a query response message 330 to the client 110 that indicates that the server 120 is operating in the defensive mode. The client 110 then communicates a resource allocation request 230 to the server 120 over the communications channel 100. Note that in this example the client 110 sent the resource allocation request knowing that the server 120 would be imposing a computationally intensive task as a pre-condition to allocate the resource. The server 120 communicates a computationally intensive task 240 to the client 110 over the communications channel 100 and sets a timer to expire at some pre-determined time limit 250 known to the client 110.

In this example, the client 110 performs the task incorrectly 260 and communicates incorrect verification of the results of the task 275 to the server 120. The server 120 determines that the task was performed incorrectly 285 via the computational task solution verifier 150 (FIG. 1). In one embodiment, the server 120 sends a negative acknowledgement 295 in response to the client 110 without allocating resources. In another embodiment, the server 120 does not respond with the negative acknowledgement 295, but rather does not respond to the client 110 at all. The client 110 then detects the lack of server 120 response by way of a time out mechanism. Such a lack of server 120 response would also constitute a negative acknowledgement by the server 120. Note that, in one embodiment, a negative server response, or no response, would result if the client 110 correctly performed the task but completed it outside the time limit 250 predetermined by the server 120.

In addition to imposing a computationally intensive task onto an adversary, it may be useful to include additional burdens on an adversary. For example, an adversary that can successfully initialize a session may be able to remain minimally active and occupy an assigned connection slot indefinitely. Eventually, an adversary with this capability could slowly but surely occupy any and all available slots at the expense of legitimate clients.

It may be useful for the session protocol to allow the server 120 to require some minimal activity to maintain an open connection with the server. The server 120 may, periodically or at its discretion, impose a task on a client 110 after connection and session establishment. This creates a deliberate computational burden associated with occupying a slot. For example, in one embodiment, the server 120 simultaneously sends puzzles to all open connections. An adversary may not have the computational resources to respond with the required minimal activity on all available slots at the same time. The protocol itself, or the server, can specify and enforce a policy of disconnecting those slots whose response or activity falls below the minimum. This inherently limits the maximum sustainable number of connections occupied by an adversary at any time based upon the computational capacity or the adversary.

Servers 120 can also impose other additional burdens upon clients 110 requesting and occupying session slots. For example, a authentication mechanism requiring a password, existing on a higher protocol layer, creates a boundary that the adversary could not likely cross, especially for a large number of acquired connections. The protocol {M}, could be used to carry client transmitted password data in addition to other data, to be processed by other higher protocol layers executing on the same server.

If a client 110 is unable to produce a required password within a time limit, the server 120 can terminate the session, making a slot available to other clients 110. A server 120 would not likely tolerate, and could be configured to detect, a large number of simultaneous connections all authenticated with the same password. In this manner, occupying many connections requires the knowledge of many passwords. Failure to meet the authentication requirement on an allocated connection can cause the connection to be terminated.

In the past, even in systems that presented these burdens to slot occupation, attacking clients 110 took advantage of the vulnerabilities of half open connections. Creating a half open connection required almost no computational resources. All available connections can be occupied before any disconnection related time out occurred, if any. Connections typically can be re-opened at a rate greater than or equal to the rate that any disconnecting mechanism would terminate the same number of connections. The maximum sustainable number of connections occupied by an adversary at any time could equal or exceed the number of connections available.

Imposing computational tasks on the adversary slows down the rate at which the adversary can occupy connections. A server connection termination mechanism, once started some time after the first connection is allocated, makes available allocated connections at a rate approximating that of the rate of slot occupation of the adversary. For example, if an adversary is unable to pass through server authentication within some time-out period, each connection expires and is made available some fixed time after being allocated. The termination rate then approaches the earlier allocation rate, once the slot termination mechanism reaches its first time out. The maximum number of adversary-occupied connections is achieved just before the connection termination mechanism operates at a rate equal or greater than the slot occupation rate. Hence, a slot termination mechanism can limit the maximum sustainable number of open connections occupied by an adversary at any given time.

This maximum sustainable connection count can be designed and limited to be less than the maximum number of available slots based upon the likely computational capacity of the adversary. This limit allows for a supply of connections to be available beyond the computational reach of the adversary while the server 120 is under attack. This added supply of connections beyond the reach of an adversary can be allocated to legitimate clients 110 while the server 120 is under attack.

The following notation will be used to elaborate on this concept. Let (A) equal the maximum sustainable number of connections an adversary could occupy based upon the likely computational capacity of the adversary. Let (N) equal the number of connections intended for normal or legitimate clients apart from those occupied by an adversary during an attack. Let (B) equal the sum total of (N) plus (A). (B=N+A) Hence, (B) is directly related to the size of the server buffer required to support the number of simultaneous executions of the protocol {M}, each requiring the use of one connection.

The buffer resources devoted to a single execution of {M} associated with one connection is denoted as a "slot." Thus, the maximum number of simultaneous executions of {M} designed to be supported by the server 120 is at least equal to (B). Slots associated with (N) are considered "normal" slots. Slots associated with (A) are considered "extra" slots. Note that the distinction between normal and extra slots is one of convenience and does not indicate any difference in functionality. The value (A) may be regarded as a defense parameter and represents in some sense the overhead associated with use of the computational task protocol to defend against adversaries in the event of an attack.

As an example, if the protocol {M} is TCP, then the number of slots in (B) represents the amount of memory reserved for half-open connections. If the protocol {M} is SSL, then the number of slots in (B) represents the number of simultaneous SSL sessions (initiations) the server 120 can support, and hence the computing power of the server 120 reserved for such sessions. Hence the buffer (B) can represent either the memory or computational resource limitations of the server.

In one embodiment, the client computational task protocol {M} includes three time parameters, $T_1$, $T_2$, and $T_3$. The parameter $T_1$ is the period of time for which a task is valid before it expires. this is the time limit 250 depicted in FIGS. 2–5. This is the time permitted for a client 110 to receive, solve and communicate the solution to a client task. The parameter $T_2$ is the period of time which the client 110 has to initiate $M_i$ after it has submitted a successfully solved task. The parameter $T_3$ is the period of time for which a buffer slot allocated for protocol $M_i$ remains in memory after the protocol is initiated and before being purged by not satisfying any other mechanism that distinguishes legitimate from attacking clients. We let $T=T_1+T_2+T_3$.

Purging of the buffer can occur when the client 110 fails a security procedure that takes place after initializing the session connecting protocol. For example, after TCP-IP is established, the next higher protocol layer can demand a secret password or other form of authentication before proceeding with the execution of the server application. It is pre-summed that an adversary cannot pass through this security barrier. If this were not true, then the adversary would not be limited to disabling the server 120 through session-establishing resource depletion.

The server 120 enters the defensive mode when it determines that it is under attack, or in any other circumstance where operating in the defensive mode would likely be advantageous to the server. In one embodiment, the server 120 is deemed to be under attack if the server memory (B) begins to fill so that more than (N) buffer slots are allocated at one time. In this case, on requesting permission to initiate $M_i$, the client 110 receives from the server 120 a client computationally intensive task (P). In order to have the server 120 permit initiation of $M_i$, the client 110 must submit a correct solution to (P) within time $T_1$. Once it has done so, the server 120 sets aside a slot in (B) for $M_i$. In other words, the server records permission for the client 110 to execute $M_i$, leaving the client 110 free to proceed with the protocol {M} as normal.

Using the above notation, a useful size for the buffer (B) is choosing an appropriate size for (A) given (N). (N) is the number of connections made available to friendly or legitimate clients by the server 120 under normal operating conditions. When implementing the client computational task defense against connection depletion attacks, the buffer (B) contains ((N)+(A)) slots. If, on average, it will take an expected (X) time steps for an adversary to solve a task, the expected number of time steps for the adversary to solve (A) tasks is (A)(X). If the buffer (B) contains ((N)+A) slots, then the adversary must solve (A) tasks in T seconds to mount a successful connection depletion attack, where, again, $T=T_1+T_2+T_3$. If (g) represents the number of adversarial time steps per second, then (T*g) represents the number of time steps the adversary has to carry out its attack within the time period T. And Tg/X is the number of computational tasks that the adversary can solve within the time T. After the expiration of T, the system proceeds to terminate slots at about the rate at which the adversary can create slots. Hence Tg/X looks to be the maximum sustainable number of simultaneous slots the adversary can keep open at one time. For the system to successfully repel such an attack, we would expect that the number of slots for the adversary (A) would exceed the maximum number of slots the adversary can occupy before the system initiates termination of those slots. (Tg/X). Hence, A>Tg/X would be likely to foil the adversary most of the time.

Otherwise, if (A)<Tg/X the adversary could occupy more than (A) slots before any one slot expired and terminated after being occupied for T seconds. As slots expire, the adversary would have more than enough time steps remaining to occupy slots at a higher rate than the rate of termination of the adversary slots. The maximum number of slots occupied by the adversary at any given time would exceed (A).

One type of a computationally intensive task is referred to as a puzzle. One type of puzzle is a cryptographic problem in which input data 550 is processed by a known cryptographic method to generate output data 570. The puzzle requires a determination of a given input data using information about the value of the output data and the known cryptographic method used to create the output data from the input data. In one embodiment, the cryptographic method is hashing (i.e., a one-way function), encryption, or the like.

Figure 6:
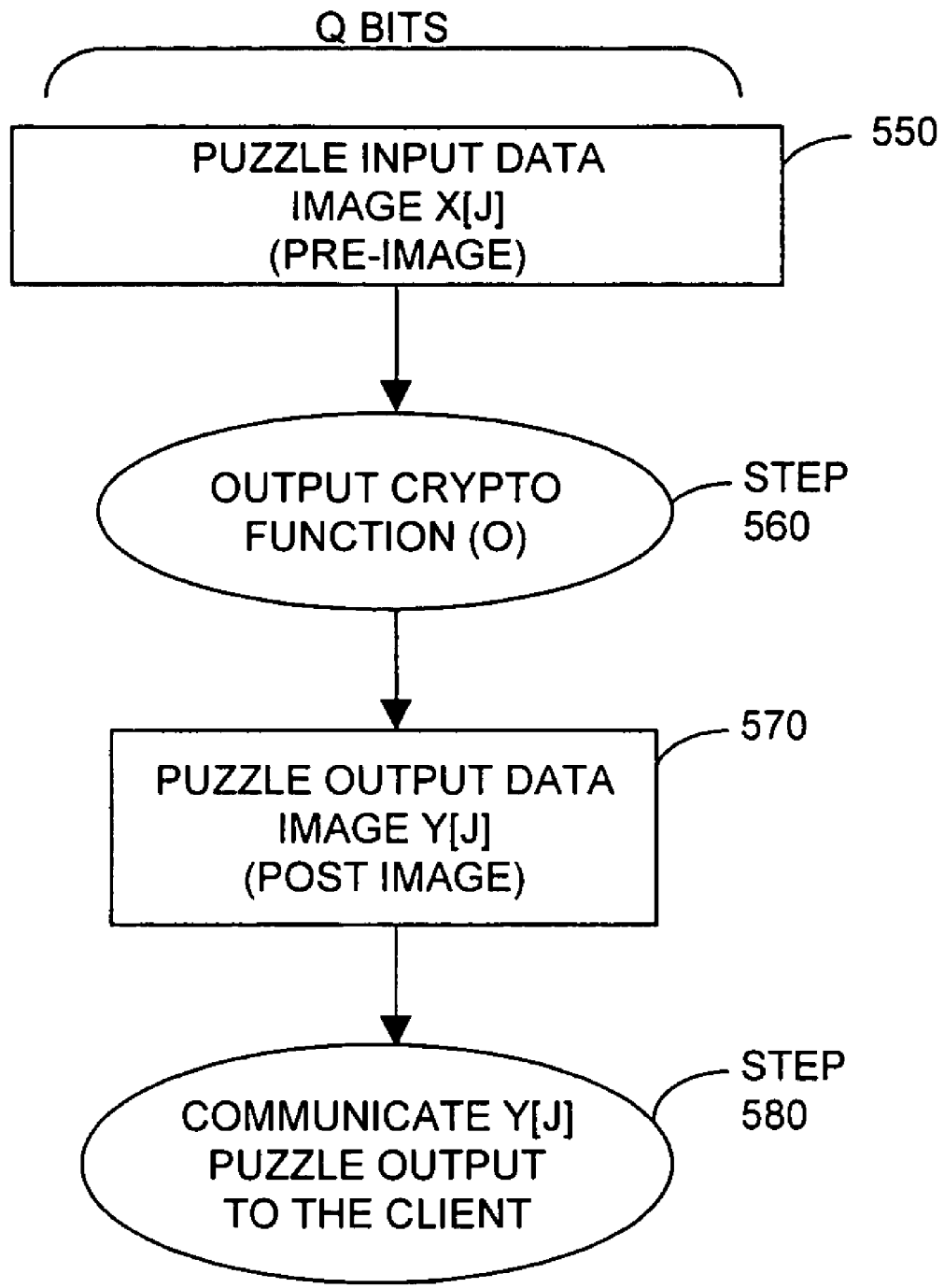
FIG. 6 illustrates an embodiment of puzzle construction.

Referring to FIG. 6, a puzzle generator 130 (FIG. 1) determines the value of the puzzle input data 550 by some method. In one embodiment, the puzzle input data 550 is chosen at random. In another embodiment, the puzzle input data 550 includes meaningful information. The input data 550 of length (Q) bits is encrypted by the output cryptographic function (step 560) into the resulting puzzle output data 570 of length (L) bits. There is no requirement that (Q) be less than, equal to or greater than (L). The puzzle itself, which is represented by the puzzle output data 570, is later communicated to the client 110 by the server 120 (step 580). The client 110 must determine the value of the input data 550, some or none of which may be revealed to the client 110.

In one embodiment, a puzzle is created by a puzzle generator 130 and is performed and solved by a puzzle solver 140 (FIG. 1). The puzzle generator 130 withholds at least some portion of the input data 550 and reveals any remainder of the input data 550 and output data 570 to the puzzle solver 140 (via client 110). The puzzle solver 140 is assigned the task of determining the value of the concealed input data 550. Generally, the puzzle solver 140 can solve the puzzle by searching through all possible values of input data 550, cryptographically processing each possible value by the known cryptographic method used to create the puzzle, and comparing the result of the cryptographic processing with the puzzle output data value 570. If a match occurs, the selected value of the input data 550 is the correct solution to the puzzle and the search for possible solutions terminates. In the worst case, the puzzle solver 140 may have to search through and test all possible input data values before finding a match, but in a typical scenario, the puzzle solver 140 will most likely have to search only through a portion of all possible values before discovering the correct solution. Statistically, the searched and tested portion averages to be about 50% of all possible input data values.

In one embodiment, the input data 550 is entirely concealed from the puzzle solver 140. In another embodiment, the input data 550 is partially concealed from the puzzle solver 140. Revealing a portion of the input data 550 of the puzzle reduces the number of possible solutions to be searched and tested by the puzzle solver 140. This reduced size puzzle is referred to as a partially solved puzzle and is also referred to as a sub-puzzle. By adjusting the number of revealed bits in the input data 550, the puzzle generator 130 can adjust the computational intensity of each puzzle. The computational intensity of the task is measured by the number of bits of input data 550 concealed from, and required to be searched for by, the puzzle solver 140.

Figure 7:
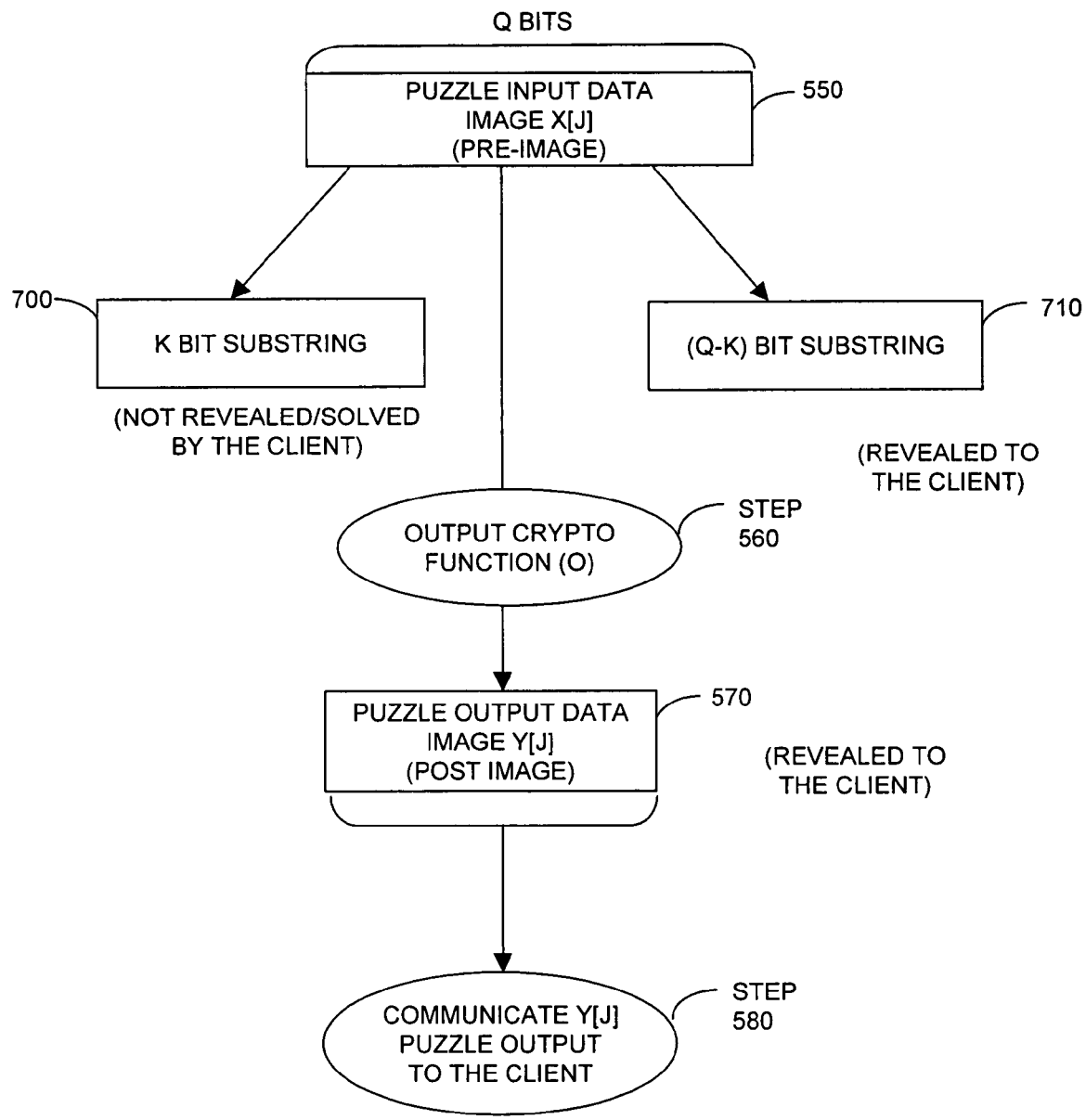
FIG. 7 illustrates another embodiment of puzzle construction in which a portion of the input data is concealed from the client.

Referring to FIG. 7, the puzzle generator 130 (FIG. 1) first generates the puzzle data 550, of length L bits, which constitutes an entire puzzle solution. This input data 550 is encrypted by the output cryptographic (hash) function (O) (Step 560) into the puzzle output data (Y[j]) 570. A portion of the input data 550, sub-string 710 of length (L–K), is provided to the client 110 along with the output data 570. A sub-string 700 of length L bits is the sub-puzzle to be determined by the puzzle solver 140 (FIG. 1). The client 110 determines the unrevealed portion 700 of the input data 550 as the solution to the puzzle. This solution to the sub-puzzle may be returned to the puzzle generator 130 as the input data 550. Alternatively, the puzzle solver 140 can return only the unrevealed portion 700 to the puzzle generator 130 if the server 120 has a means of reconstructing the remaining data comprising the puzzle.

In one embodiment, a client puzzle $P_i$ consists of a number of independent, uniformly sized sub-puzzles. The use of multiple sub-puzzles increases the difficulty for an adversary in guessing solutions. For example, a (K+3)-bit puzzle with one large (K+3) bit sub-puzzle requires the same average amount of work for a legitimately determined (linear searched) solution as a puzzle with eight different smaller (K) bit sub-puzzles. Both puzzles require (K+3) concealed bits to be solved by the puzzle solver 140. As will be explained, it is possible to guess a solution to the one large sub-puzzle with probability $2^{-(k+3)}$, but only $2^{-8k}$ for the group of eight smaller (K) bit sub-puzzles. With respect to guessing, multiple sub-puzzles may be advantageous.

Linear searching involves embarking upon selecting and testing the entire set of all possible solutions in a known and non-redundant order until a correct solution is identified, or until the entire set of possible solutions have been selected and tested. This is also referred to as a "brute force" or "ordered search" of all possible solutions. Choosing solutions starting with value 0, then 1, then 2, and incrementing by value one until a solution is found or the maximum possible solution value is tested is an example of linear searching. Each chosen solution is tested by applying the known cryptographic algorithm associated with the puzzle, and comparing the result to the output data 570 provided by the puzzle generator 130. When the result matches the puzzle output data 570, the chosen input data value with the hashed result matching the puzzle output data 570 (post-image) is the correct answer.

A guess is a solution choice that is not tested by the client 110 (i.e., not hashed), but instead communicated to the server 120 as an answer to the puzzle without testing. Without testing, the guessed value (untested possible solution value) is very unlikely to be the correct answer. If the server 120 does not penalize the client 110 for submitting incorrect solution values, then sequentially guessing the solution to a puzzle might require less computational time and effort by the client 110 than legitimately determining (solving for) a correct puzzle solution. If the attacking client 110 does not have access to puzzle solving software, it may be forced to guess in order to provide a correct solution to allocate a connection.

A puzzle comprised of multiple sub-puzzles penalizes the guessing adversary beyond that of a puzzle containing one sub-puzzle of the same total size. The answer to each sub-puzzle is a portion of an answer for the entire puzzle. When a client 110 actually tests and verifies the answer to a sub-puzzle, it eliminates the need to select and test any remaining unselected and untested possible solution values associated with that particular sub-puzzle. The client 110 no longer concerns itself with that sub-puzzle portion of the entire puzzle answer and then focuses its attention to the remaining unsolved sub-puzzles.

Conversely, when guessing, the client 110 gets no feedback from the server 120 if one or more sub-puzzle answers are correct. If any sub-puzzle answer is incorrect, the entire puzzle answer is incorrect and rejected. The server response to the guess is ambiguous with respect to a particular sub-puzzle solution. The guessing client 110 never knows when it has arrived at a correct answer to a sub-puzzle until ALL sub-puzzles are answered correctly. Correct guesses to some but not all sub-puzzle solutions are discarded until all correct sub-puzzle solutions are guessed for the entire puzzle at the same time. This causes the guessing client 110 to disproportionately spend more time and effort to guess the solution to a multiple smaller sub-puzzles than to one large sub-puzzle of equal total size. Creating sub-puzzles introduces a penalty for guessing but not for legitimate solving, searching and testing of all possible solutions, of an entire puzzle.

In an another embodiment, the server 120 does not accept more than one or more than a limited number of solutions to a particular puzzle from a client 110.

If the variable (m) represents the number of sub-puzzles contained in a one puzzle, and the j'th sub-puzzle in $P_i$ is denoted by $P_i[j]$, then a puzzle $P_i$ consists of sub-puzzles $P_i[1], P_i[2], \ldots, P_i[m]$. In one embodiment, a client puzzle P consists of a collection of (m) independent sub-puzzles. Each sub-puzzle P[j] consists of a hash image with partially revealed input data 550 (pre-image), while solving a sub-puzzle puzzle involves finding the remaining part of the input data 550 (pre-image). In one embodiment of a client puzzle protocol, two properties are desirable: First, it is desirable that the puzzle be time-dependent, so that the client 110 has only a limited time in which to produce a solution to the puzzle. Second, it is desirable that the puzzle be able to be constructed in a self authenticating way. In particular, it is desirable that the server 120 be able to verify, via the computational task solution verifier 150 (FIG. 1), without the use of a database containing puzzle imposition history data, or any other data, that a puzzle solution presented by a client 110 was in fact imposed on the client 110 by the server 120 and that the imposition of the associated puzzle has not yet expired. Hence, in this embodiment, the client 110 returned puzzle solution data indicates that the puzzle and its solution are legitimate. This mechanism can also be referred to as a "stateless, memory less or history less" method of the server 120 to process the return of previously imposed puzzles.

A (K) bit puzzle, like a (K) bit sub-puzzle, has $2^k$ possible solutions. A puzzle consisting of (m) sub-puzzles therefore has $(m)2^k$ possible solutions. On average, solving a puzzle consisting of (m) sub-puzzles requires selecting and testing about half, that is $(m)2^{k-1}$ solutions, before discovering a correct solution to all sub-puzzles within a puzzle. If (X) represents the average number of time steps required to solve a computational task. (X) as applied to a puzzle containing (m) sub-puzzles equals $(m)2^{k-1}$ time steps. As explained earlier, A>Tg/X would be likely to foil an attacker most of the time. Consequently, (A), the number of extra connection slots reserved to attacking clients 110, should be greater than $Tg/m2^{k-1}$ ($A>Tg/m2^{k-1}$)) to foil an attacker most of the time.

Still referring to FIG. 7, in one embodiment, the input data value 550 (FIG. 6) representing the solution to the puzzle is a random value. In another embodiment, the input data 550 includes information that has meaning only to the puzzle generator 130 but not to the puzzle solver 140 (FIG. 1). This meaning may be a closely held secret known only by the puzzle generator 130, so that any associated meaning of the input data value 550 is an unknown value to the puzzle solver 140 (FIG. 1). This prevents the puzzle solver 140 from determining input data patterns that can be used to solve future puzzles in less time than otherwise would be expected from sequential puzzle solving efforts.

Figure 8:
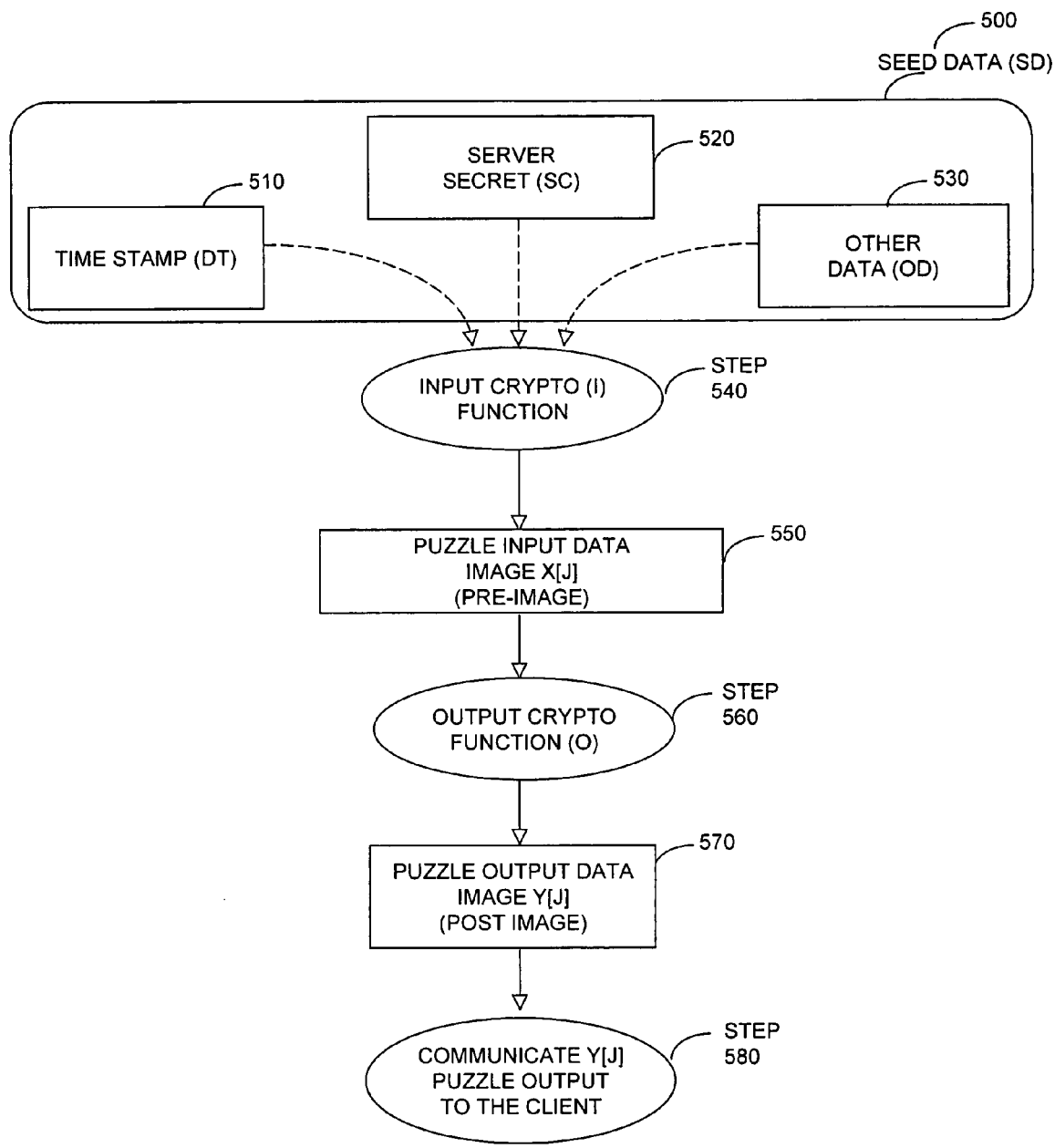
FIG. 8 illustrates another embodiment of puzzle construction that enables self-authentication by incorporation of timestamp, server secret and other data.

Referring to FIG. 8, in one embodiment, the input data 550 itself is the result of an encryption method applied to separate data known to the puzzle generator 130 and the puzzle solver 150. This separate data, or "seed data" (SD) can be encrypted by a method unknown to the puzzle solver 140 to form the input data 550 of the puzzle. Such a technique preserves concealment of the seed data from the puzzle solver 140 after solving the puzzle. The fact that the input buffer 550 is the result of encrypting seed data can itself be concealed from the puzzle solver 140. Such a method creates an unintelligible series of bits that constitute a puzzle solution for the puzzle solver 140 to determine.

In another embodiment, the seed data (SD) contains information that the server 120 can reconstruct to verify the legitimacy of a puzzle solution that is later received from a client 110. For example, in one embodiment, seed data contains information that describes the circumstances surrounding the imposition of the puzzle by the server 120 on the client 110. For example, the seed data can include information identifying the server 120, the client 110, protocol addresses, the session, the date and time the puzzle was imposed, the date and time of the expiration of the puzzle, etc. Upon decrypting the input data 550 received from a client 110 as a puzzle solution, the resulting seed data enables the server 120 to better identify and track puzzles imposed and puzzle solutions received without relying on a list or database of previously generated puzzles. This also prevents the client 110 from submitting an old puzzle and its solution as a correct response to a different and newly imposed puzzle.

The server 120, upon receiving from a client 110 what is represented as a solution to a previously imposed and un-expired puzzle, can decrypt the received solution (input data 550) and can identify that the puzzle was imposed and expired long before the current time, and cannot be a correct response to any currently un-expired puzzle imposed by the server 120 upon the client 110.

Encryption of the seed data can be performed by an encryption method using a secret key value. Even if the client 110 knows that the puzzle input data 550 is encrypted seed data, the client 110 can not determine the seed data without knowing how the seed data was originally encrypted, or without knowing the secret key value associated with the any known encryption method. In one such embodiment, the secret key is periodically modified to prevent determination of the secret key by an adversary.

Still referring to FIG. 8, the puzzle generator 130 (FIG. 1) first generates the puzzle input data 550 (FIG. 6), which is the puzzle solution. In one embodiment, this input data 550 is constructed by combining data and time stamp information (DT) 510, a server secret (SC) 520 and possibly other (seed) data (OD) 530 that can be used to identify and authenticate the puzzle solution returned by the client 110. The input cryptographic (hash) function (I) (Step 540), encrypts this collection of server data into the puzzle input data (X[j]) 550. Once the input data 550 is generated, it is further encrypted by the output cryptographic (hash) function (O) 560 into the puzzle output data (Y[j]) 570. The output data 570 constitutes the puzzle that is to be communicated (Step 580) from the server 120 to the client 110. The client 110 returns at least the input data 550 as the solution to the associated puzzle, as described above.

The following notation is useful to describe types of seed data (SD). Let $M_i$ denote the i'th session that executes the protocol {M} on the server 120 by a legitimate client 110 or by the adversary. We denote by $M_i^d$ the d'th message sent in the i'th session executing protocol {M}. To simplify the notation, the assumption is made that the protocol {M} is client-initiated, in other words, the first message in the protocol is sent from the client 110 to the server 120, and subsequent messages alternate direction. Hence, $M_i^1$ is sent from the client 110 to the server 120, $M_i^2$ from the server 120 to the client 110, and so forth. It is also assumed that $M_i^1$ is not time-dependent. (Note that the scheme can be straight-forwardly adapted, though, to the cases where {M} is a server-initiated protocol or $M_i^1$ is time-dependent.)

Let z<i> denote the i'th bit of a bitstring z, and let z<i,j> denote the sequence of bits z<i>, z<i+1>, . . . , z<j>. Let (I) denote a non-invertable input hash function whose output is of length (N). Because the hash (I) need not be collision resistant, one embodiment of the invention employs the fast hash function (MD4) which is known to be vulnerable to collision searches, but as yet still resistant to inversion. Let (DT) denote the current date and time according to the server clock. Let (SC) be a secret seed value of appropriate length (say, 128 bits) held by the server.

To pre-encrypt seed data, the server 120 first generates a long-term, locally held secret (SC). This secret should be of length sufficient to forestall cryptanalytic attacks (e.g., 128 bits). When it receives a request from a client 110 to initiate the protocol {M}, the server 120 creates a puzzle P[j]. For each sub-puzzle within the puzzle P the server 120 computes the bitstring X[j] as I(SC, DT, M, IX), where (DT) is a timestamp set to the current data and time, (M=$M_i^1$) is intended to uniquely identify the connection requesting client 110 and (IX) is the sub-puzzle index among (j) sub-puzzles. This timestamp, or any other portion of seed data, can be optionally authenticated with the use of a secretly computed message authentication code as part of other (seed) data (OD) 530 to be encrypted. By itself, being encrypted with the secret input cryptographic (hash) function 540 also serves as a form of authentication of all seed data encrypted. (If $M_i^1$ is not unique to the client 110, it may be desirable to include a nonsense value (nonce) in the hash as well, this nonce effectively becoming an addition to the puzzle P.) This nonsense value can be uniquely associated with the particular session connection requesting client 110 to be imposed with the puzzle $P_i$[j]. Recall from above that the sub-puzzle P[j] consists of the bits x[j]<K+1,1> and the hash of the input data (pre-image) X[j] 550 onto the output data (post image) Y[j] 570. The server 120 sends the puzzle containing (j) sub-puzzles P[j] to the client 110 along with the time stamp (DT).

The client 110 computes the solution to P[j] by solving each of the [j] sub-puzzles in the order as presented in the puzzle P[j]. To solve a sub-puzzle, the client 110 performs a linear search of all possible solutions to the sub-puzzle. Testing a possible solution will require the client 110 to perform a single output hash (O) 560 of that possible solution into a hashed result that is compared with the output data 570 of that sub-puzzle. If there is a match, the correct solution for that particular sub-puzzle has been found. The interval of time required to exercise this procedure for each possible solution is referred to as a time step. A given (K) bit sub-puzzle P[j] will have $2^k$ possible solutions to be searched for and tested. Hence, the expected number of time steps for a client 110 (or adversary) to solve a sub-puzzle will be $2^k/2=2^{k-1}$, while the maximum time will be $2^k$. Since a puzzle contains (m) sub-puzzles, the expected or statistical average number of time steps for a client 110 (or adversary) to solve a puzzle P will be $m*2^{k-1}$, while the maximum number of time steps will be $m*2^k$.

When the client 110 sends the entire puzzle solution, which the server 120 has intended to contain the input hash encrypted timestamp (DT) 510 and (SC) 520 and possibly other data (OD) 530, the server 120 can verify, via the computational task solution verifier 150 (FIG. 1), in a self-authenticating fashion that all sub-puzzles, and thus the entire puzzle P, has been correctly solved. This is performed by verifying the correct encryption of the server secret (SC), the time stamp (DT), and any other information buried inside each correct sub-puzzle solution, and comparing the time stamp (DT) with the current time to check that the (sub)puzzle has not yet expired. This time stamp, or any other portion of seed data (SD) can be optionally authenticated with the use of a secretly computed message authentication code residing as part of the other data (OD) 530 portion of the seed data (500).

Hence the server 120 need not separately store such information associated with each puzzle in anticipation of identifying and authenticating the associated puzzle solution later returned by a client 110. The self authenticating portion of the solution (input) data 550 is denoted as ($\{X[j]<1, K>\}_{j=1}^m, M_i^1, DT$), which indicates that the self authentication information ($M_i^1$) and (DT), are stored within the first (K) bits of the solution input data (pre-image) 550. These K bits are concealed from the puzzle solver 140 (FIG. 1). If an incorrect solution is submitted, it will not lead to the original seed data (SD) 500 (and it will be rejected by the server.

Note that to prevent an adversary from using the same solved puzzle for multiple allocations, the server 120 must ensure that only one slot in B is allocated for each request $M_i$. One way to accomplish this is to let some unique identifier derived from $M_i^1$ be associated with the slot allocated for $M_i$. On receiving a correctly solved puzzle corresponding to $M_i$, the server 120 checks that no slot has been allocated for it already. One means of enabling a rapid search for already-used identifiers would be to assign slots through bucket hashing on identifiers.

Since a puzzle includes inversion problems of very limited size, and collision attacks are therefore not a concern, relatively short hash one-way (cryptographic function) images and input data buffers (pre-images) 550 can be used. In determining the size of a sub-puzzle input data (pre-image) X[j] 550, the principle concern is with the possibility of dictionary attacks. A dictionary is a table mapping every possible input value to its actual pre-computed output value for a particular hash function. To avert such attacks, a 64-bit hash input image 550 (pre-image) 550 is sufficiently large to discourage the creation and use of dictionaries in most settings. In considering the size of a sub-puzzle image Y[j] 570, it is desirable to ensure, for the sake of analyses, that the sub-puzzle is very likely to have only a single solution. Under this constraint, it is reasonable likewise to make the sub-puzzle image 64 bits long. Given sub-puzzles of these proposed sizes, the size of a puzzle will be somewhat less than (16*(m)) bytes.

In one embodiment, sub-puzzles can be intentionally constructed with some overlap of common information allowing sub-puzzles to be represented with less data. The overlap can be intended to exist between the input data 550 and output data 570 of a particular sub-puzzle. The puzzle generator 130 need only represent the sub-puzzle with these common bits of data. The server 120 simply verifies the correctness of any remaining non-overlapping bits, via the computational task solution verifier 150, to verify a correct solution. If some "overlap" of post image data is constructed into each sub-puzzle that resides within the same puzzle, it is possible to construct puzzles that are substantially more compact and easy to verify, at the expense of some complexity and less easily demonstrable cryptographic properties. To construct a puzzle in this way, the server 120 computes a value (W) of, for example, L/2 bits derived from I(SC, DT, $M_i^1$), where $M_i^1$ is the first client 110 message sent to establish a connection with the server 120, SC is a secret value known to the puzzle generator 130 and puzzle verifier 150, and DT is a data and time stamp. The value (W) alone is sufficient to represent data common to (m) distinct sub-puzzles P[1], P[2], . . . , P[m] as follows. Sub-puzzle P[i] consists of the task of finding an (L/2)-bit value $z_i$ such that the first K bits of $(x\|i\|z_i)$ match the first (K) bits of the output cryptographic (hash) function 560 $O(W\|IX\|z_i)$, here $\|$ denotes bitstring concatenation and (IX) represents a fixed-length encoding of the sub-puzzle index (IX). An (L/2)-bit sub-string $z_i$ with the desired property constitutes a correct solution to sub-puzzle P[IX].

In other words, for a sub-puzzle with overlap, only the first (K) bits of the output data 570 is revealed to the client 110. The client 110 finds an input data 550 value, containing the same first K bits of the output data 570 value, that when hashed with the output hash function (O) 560, produces output data 570 containing the same first (K) bits revealed. The first K bits of the input data 550 must match the first K bits of the output data 570. There are many possible output data 570 values that contain the first K bits provided. Without the matching first K bit requirement, there are probably many possible input data 550 values that when hashed 560, would match one of the many possible output data 570 values matching the first K bits provided. But with the matching first K bit requirement, there are fewer if any input data 550 values that when hashed, would match one of the many possible output data 570 values matching the first K bits provided. The advantage of this variation of sub-puzzle construction is that less bits are required to be stored to represent all the sub-puzzles residing within the entire puzzle.

Like other types of puzzle construction previously discussed, the hash function requires only resistance to inversion, but not resistance to collision. Thus, an MD4 hash function would be a suitable cryptographic function. Since computing an MD4 hash requires only about 400 instructions, construction of a puzzle of this more efficient type requires only about 400 instructions on the part of the server. In a typical setting, a puzzle would be roughly 8 bytes long plus service values, while a puzzle solution would be about 64 bytes long. Service values include such as the time and IP protocol related information that go into constructing the puzzle.

Complete verification of a correct puzzle containing sub-puzzles of this type, requires (m+1) hash computations, one hash computation to compute (W) and another (m) hash computations to verify all sub-puzzle solutions. But if a puzzle is incorrect, it must contain at least one incorrectly solved sub-puzzle. Hence, by checking sub-puzzles in random order, the server 120 can be assured of performing at most m/2+1 hash computations on average to verify an incorrectly solved puzzle. In a typical setting, in which m=8, this would correspond to about 2,000 instructions.

Alternative embodiments of this puzzle construction are achievable using a fast block cipher, e.g. RC6, in lieu of a hash function. In fact, it would be acceptable to use a reduced-round block cipher for this purpose, provided that it is still not worthwhile for an adversary to mount a cryptanalytic attack, that is an attack based on exploiting the properties of the cryptographic function.

Figure 9:
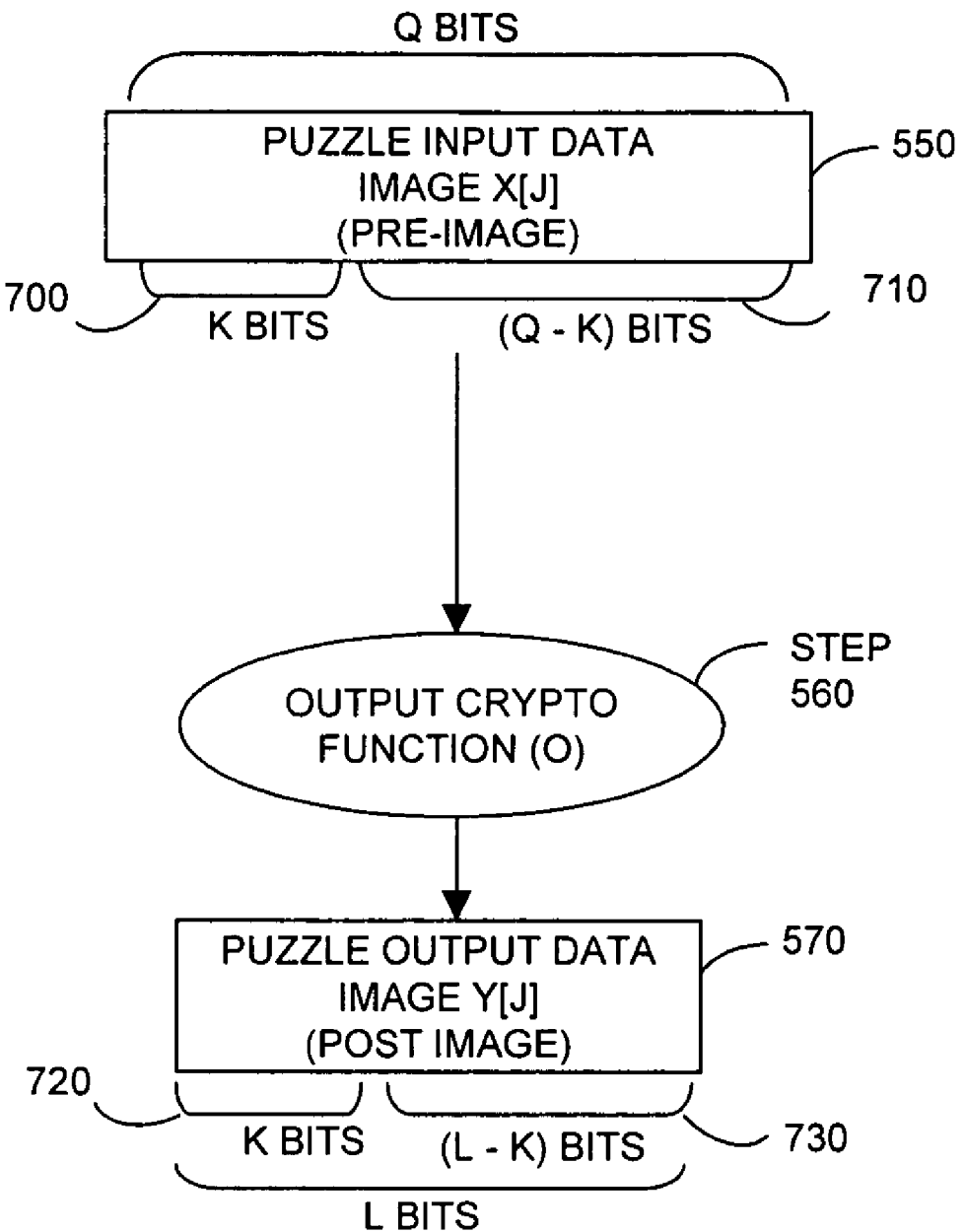
FIG. 9 illustrates another embodiment of puzzle construction.

Referring to FIG. 9, in one embodiment, the puzzle generator 130 (FIG. 1) generates puzzle input data (X) 550 (FIG. 6) of length M bits. A portion of the input data 550, a sub-string of length (K) bits 700, is revealed as portion of the puzzle solution. The remaining bits 710 are an (Q-K) bit sub-string that constitutes the sub-puzzle solution to be determined by the puzzle solver 140 (FIG. 1). The puzzle solver performs a linear search to determine the (Q-K) bit sub-string, which when provided as an input to the cryptographic function O (STEP 560), results in output data 570 having a K bit substring 720 that is identical to the K bit sub-string of the input data. In other words, in this embodiment, the computational task is the task of determining what unknown portion of the input data 550, namely the (L-K) bit sub-string 710, will produce the same known K bit substring 720 of the output data 570. The value of the (L-K) bit sub-string 730 in the output data 570 is not important, and such data can be classified as a sub-string of "don't care" bits. The K bit substring portion of the output data 570 must be satisfied by the computational task. As shown in FIG. 9, this K bit substring portion is located as the first portion of the input data 550 and the output data 570. The K bit substring of the output data 570 could be a same or different portion of the K bit substring of the input data 550.

Figure 10:
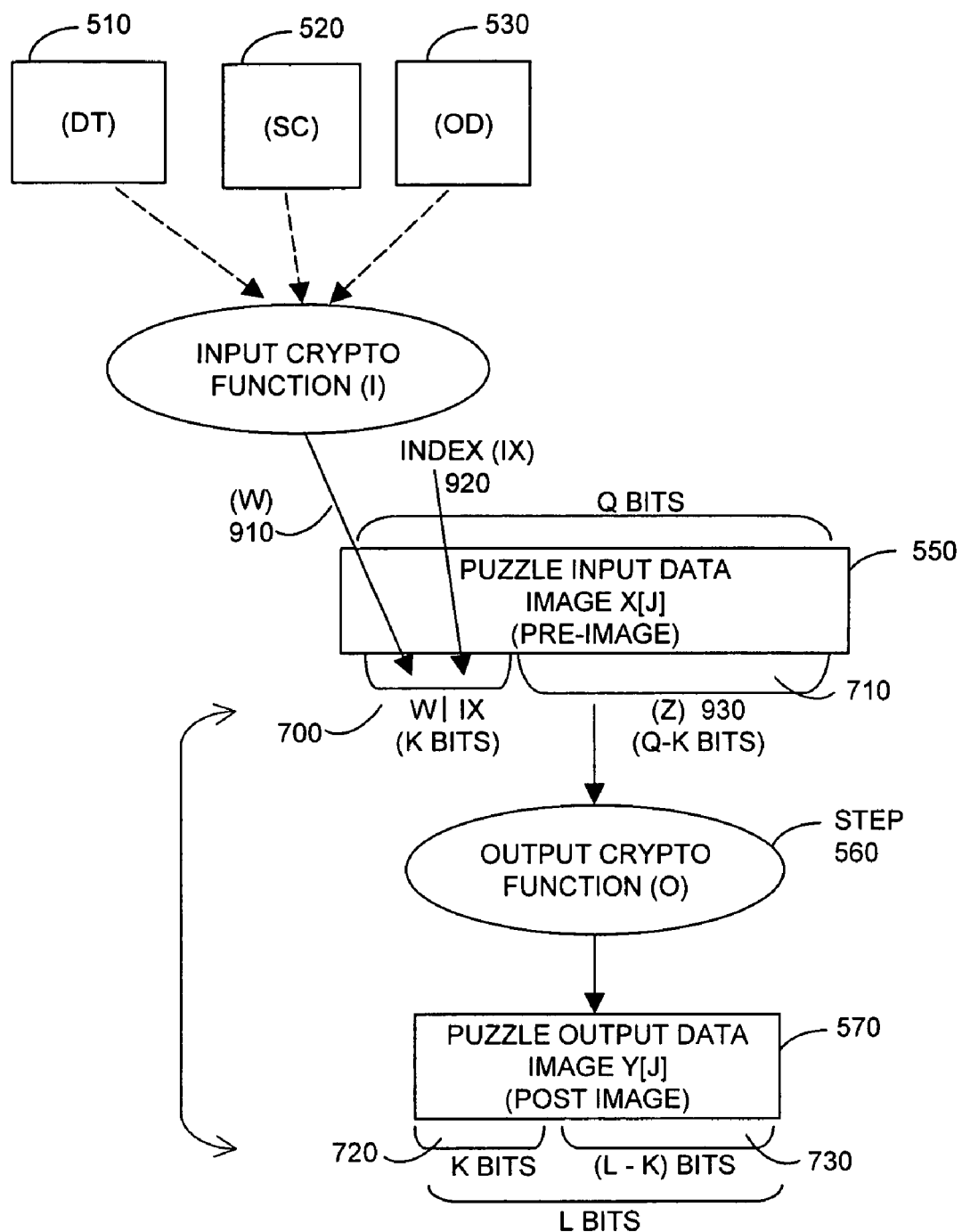
FIG. 10 illustrates yet another embodiment of puzzle construction that incorporates both the embodiment of FIG. 9 and the self authentication of FIG. 8.

Referring to FIG. 10, in another embodiment, the embodiment of FIG. 8 is combined with the embodiment of FIG. 9. Here, a number of sub-puzzles, identified by an index IX 920, are used. Each subpuzzle includes the hashed or encrypted combination of one or all of a date/time stamp (DT) 510, server secret (SC) 520, and possibly other data (OD) 530. These items are hashed or encrypted to form the substring (W) 910.

Other data (OD) 530 can include information unique to each client. For example, other data (OD) 530 can include protocol {M} information uniquely identifying the client 110, such as the first message $(M_i^1)$ containing the client's protocol address information. If this information is encrypted, the server 120 can later associate the K bit substring 700 of the puzzle with the information identifying the client 110.

For each sub-puzzle X[j], the client will find the (Q-K) bit substring Z 710 that will, when concatenated with values (W) 910 and (IX) 920, and applied as input to cryptographic function (O) 560, result in output data 570 with a K bit substring 720 that matches the K bit substring of the input data 700.

With suitable parameterization of K and L, there is only an exponentially small likelihood that no answer exists for a particular constructed puzzle. Hence, the puzzle generator need not pre-compute an answer for this kind of puzzle.

In the simple implementation of the client puzzle protocol described above, the security parameters K and (m) are fixed. In other words, when the server 120 transitions into a defensive mode, (N) normal or legitimate client buffer slots are allocated within the entire set of (B) buffer slots. It also distributes puzzles of uniform difficulty to clients requesting initiation of protocol {M}. Note, though, that it is possible for the server 120 to scale puzzle sizes and thus impose variably sized computational loads on the client. In particular, a computational task generator 130 might be configured to scale the difficulty of puzzles according to the severity of an attack on the server. One measure of the severity of an attack could be based upon the size of the portion of the server buffer that becomes filled during the attack. Also, the time-out parameters $T_1$, $T_2$, and $T_3$ can be scaled based upon the measured severity of an attack. Through modification of client puzzle parameters, server performance can be caused to degrade gracefully, and in proportion to the severity of the threat to the server.

Modeling the attack using the average number of time steps to perform a computational task does not consider the statistical possibility that the attacking client manages to perform such tasks faster than the average expected time per task. It is possible that if the adversary mounts a sustained attack, she will "get lucky" at some point and encounter a succession of easy puzzles. This would enable the adversary to, in relatively short bursts, actually perform more than (A) puzzles in (A)(X) seconds. In addition, a crafty adversary may not explicitly solve all of the puzzles she submits. Instead, she may try to guess the solutions to some puzzles, or attack puzzles by partially solving and partially guessing at them. If the server 120 does not restrict the number of attempts a client has to solve an imposed puzzle, such a crafty adversary might succeed in solving puzzles faster than legitimately searching and testing for a correct puzzle solution. Statistically, it is unlikely that an adversary can "be lucky" for extended periods of time. But it is statistically more likely that an adversary can "be lucky" for short periods of time. Being lucky for these short periods of time may enable an adversary to disable such a server 120, calculating buffer sizes based upon the average expected time to solve a task under the previously described model.

A proof is therefore useful to establish the size of the buffer required to address these added considerations. Let $C=Bm2^{k-1}/Tg$. Recall that the expected time steps for the adversary to solve (A) puzzles associated with (A) extra connection slots is $Am2^{k-1}$. Intuitively, let (C) express roughly the ratio of the number of times larger than the value (A) than would be expected based upon the adversary legitimately solving puzzles with a particular computational capacity. In following theorem, note that $10^8$ MIPS represents an arbitrary upper bound on the computational power of the adversary, and is given only to simplify the form of the theorem.

Theorem 1: Assume an adversary with at most $10^8$ MIPS of computing power that mounts connection depletion attack for no more than a year. Assume further that puzzles are constructed such that (m)>=8. Then if C>=7/2 and $B>=1100$, the probability of an adversary mounting a successful attack is $<2^{-100}$. QED Note that the size of K is determined by C and by the parameter T. In order to simplify analysis, Theorem 1 is proven for parameters larger than would be needed in practice. In practice, designers are encouraged instead to make use of the following heuristic. Again, the upper bound of $10^8$ MIPS is selected arbitrarily to simplify the form of the heuristic.

Heuristic 1: Assume an adversary with at most $10^8$ MIPS of computing power that mounts connection depletion attack for no more than a year. Assume further that puzzles are constructed such that m>=8. Then if c>=4/3 and B>=1000, the probability of an adversary mounting a successful attack is $<2^{-100}$. QED Theorem 1 and Heuristic 1 rely on a number of assumptions which can be relaxed somewhat in a real system design. For example, sizes of m larger than 8 reduce the required buffer size. A protocol designer can obtain tighter bounds on buffer sizes.

EXAMPLE

As a demonstration of how the client puzzle protocol ought to be parameterized, consider a scenario in which an adversary wishes to mount a TCP SYN flooding attack. Suppose the system under consideration is one in which clients typically have 100 MIPS of computing power, and an adversary is anticipated to be able to harness the full power of 20 client machines. Thus the adversary has 2,000 MIPS of computing power at her disposal.

Assume that MD4 is the hash function used to construct puzzles. One MD4 computation requires about 400 instructions. Hence, a client can perform 250,000 MD4 hash computations/second per client machine. The number of time steps per second (g) for the adversary, which is assumed to have 2,000 MIPS of computing power from 20 client machines, is 5,000,000 hash computations/second. The DEC archive note "Performance Tuning Tips for Digital Unix" suggests that half-open TCP SYN connections be permitted to persist for a period of time on the order of 75 seconds ($T_3$=75 seconds). Assume that $T_1+T_2$ is also about 75 seconds. In other words, a client has 75 seconds to receive and submit a solved puzzle and initiate a TCP connection. Hence T=150 seconds. This corresponds to $150*5*10^6=7.5*10^8$ time steps for the adversary.

Suppose client puzzles consisting of 8 sub-puzzles, each with 16 bits. Thus, m=8 and k=16. The search space associated with a puzzle is of size $8*2^{16}$=524,288, and the expected number of solutions searched being one-half the search space. Hence, at 250,000 MD4 hash computations per second, on average, a client should take just over a second to solve a puzzle.

A server 120 in the 100 MIPS class has a typical maximum processing speed of between 1,000 and 2,000 TCP connections per second. Thus the roughly 400 instruction overhead associated with construction of a puzzle translates into a performance requirement of $\frac{1}{250,000}$ seconds per puzzle, a penalty of much less than 1% relative to TCP connection computation time of no more than $\frac{1}{1000}$ seconds.

Verification of an incorrect puzzle takes at most an average of 2,000 instructions, equivalent to at most 2% of the time required to establish a TCP connection. As noted above, puzzles can be constructed to be about 8 bytes of post-image in size (plus service information) while solutions are about 64 bytes of input image (pre-image) 550 in size. These penalties are small and, of course, paid only when the server 120 is operating in a defensive mode and likely under attack.

Now, by Theorem 1, at least c>=7/2 and B>=1100 is required. Since $B=CTg/(m2^{k-1})$, this means that we require $B>=(7/2*7.5*10^8)/(8*2^{15})\approx10,000$. Hence we need B to contain about 10,000+((N)) buffer slots. Heuristic 1, however, specifies that c>=4/3 and b>=1000. This instead gives us $b>=(4/3*7.5*10^8)/(8*2^{15})\approx3,750$. Hence, in practice, B should contain on the order of 3,750+((N)) buffer slots. Again, more careful analysis would yield a smaller value of B.

In conventional environments, it is standard to adopt a minimum server TCP buffer size of 2048 slots. This includes buffer slots devoted to defense against TCP SYN flooding attacks. Hence the client puzzle protocol does not yield a substantially larger buffer size than current recommendations.

Of course, the example above is based on a simple client puzzle protocol in which puzzles are of uniform difficulty, requiring just over a second for a client machine to process. More effective client puzzle parameterization could lead to more graceful degradation, and consequently to a smaller requirement on the server buffer size.

The "client puzzle protocol" is a method comprising a set of rules for imposing computational tasks (puzzles) by servers onto clients to protect servers from certain types of communications based attacks. This type of imposition will cause only a small degradation in the time required for the server 120 to establish sessions with legitimate clients. Conversely, an adversary must have access to large computational resources to create an interruption in service provided by the server 120 to legitimate clients.

Proofs

The following discussion is intended to analyze and prove results about the level of defense provided by a client puzzle protocol. At first glance, this would seem simple, as we can easily compute the average time required by the adversary to solve a puzzle, and we know the number of puzzles required to overload the server. Two facts, however, make the analysis tricky. The first is that the time required to solve a client puzzle is a random variable. Since solving a client puzzle involves a search of the space of potential solutions, it is possible that an adversary may, with luck, happen upon the solutions to a larger number of puzzles in a short space of time. The second fact is that it is possible for an adversary to guess at the solution to a client puzzle. With some small probability, an adversary's guess will be correct, and the server 120 will allocate buffer memory for a connection. Together, these two facts mean that even an adversary with limited computing resources can mount a successful attack against the client puzzle protocol with some probability. By mixing the processes of solving and guessing appropriately, it might in principal be possible for a clever adversary to mount a successful attack. Our aim in this section is to prove that when the client puzzle protocol is correctly parameterized, the probability of mounting a successful attack in a reasonable space of time is negligible for any adversary.

A.1 Preliminaries: Notation and Assumptions

The notation used in the following proofs is not necessarily the same as the notation used previously. Known differences are the following.

The variable (A) indicating the maximum sustainable number of connections an adversary could occupy based upon the likely computational capacity of the adversary, will now be represented by (b).

The variable (K) representing the size of a puzzle based upon the number of concealed bits, will now be represented by (k).

Other variables, such as (z) and (W) are defined differently in the following proofs.

Let P be a puzzle of the form described above, and let P[j] be the $j^{th}$ sub-puzzle of P. Let S[j] be the set of possible solutions to P[j], i.e., the $2^k$ possible assignments to bits x[j]<1, k>. Since x[j] and y[j] are of equal length, we assume in our analysis that H, (the output cryptographic function (O) 560), the function used to generate the sub-puzzles in P, is a random permutation. (In other words, we assume that h is 1—1 when input and output are of equal length, and we also make a random oracle assumption on h.) Thus a sub-puzzle has a unique solution, and the most effective strategy for solving a sub-puzzle P[j] is brute force, i.e., an arbitrarily ordered (but non-redundant) search of the space S[j]. As above, we define a time step to be the examination of a single element of S[j]. Recall that the expected number of time steps for a brute force search to yield a solution to P[j] is $2^{k-1}$, and the expected number of time steps for a brute force search to yield a solution to P is $m2^{k-1}$. We assume that the time for the adversary to guess at and submit a solution to a puzzle is one time step. As the application of a hash function such as MD4 requires about 400 instructions, this assumption is accurate (and perhaps even conservative) for real-world settings.

Let us denote S the set of possible solutions to the puzzle P. Let us use x to denote the product of sets. The set S of possible solutions to P, i.e., $S=S[1] \times S[2] \times \ldots \times S[m]$. Hence the set S is isomorphic to the set of all bitstrings of length km. Let $S^*$ denote the subset of S containing all solutions to P which the adversary has not yet eliminated from its search.[1] Suppose, for example, that the adversary has solved sub-puzzle P[1], and has unsuccessfully searched a set consisting of half of the possible solutions to sub-puzzle P[2]. Then $S^* = x_1 < 1 \ldots k > \times (S[2] - S^*[2]) \times S[3] \times \ldots \times S[m]$, so $S^*$ effectively contains $2^{km-k-1}$ bitstrings. Let us define $s(P) = m - \Sigma_j(|S^*[j]|/|S[j]|)$. Hence, in our example here, $s(P) = 3/2$. The quantity s(P), which we refer to as the solution level of P, may be loosely regarded as the number of sub-puzzles which the adversary has solved in P. We may define s(P[j]) analogously to be the portion of sub-puzzle P[j] which the adversary has solved. In particular, $s(P[j]) = 1 - (|S^*[j]|/|S[j]|)$.

[1] Note that when $|S^*|=1$, the adversary has solved the puzzle in question, so that $|S^*|=1$ and $|S^*|=0$ are, for all intents and purposes, equivalent conditions. We let either $|S^*|=1$ or $|S^*|=0$ denote a finished puzzle—whichever is convenient for notation and mathematical consistency in a given context. WE do likewise for $S^*[j]$ for any sub-puzzle.

In the client puzzle protocol as described above, there are three expiration times: expiration time $T_1$ on client puzzles, $T_2$ on permission to initiate protocol execution $M_i$, and $T_3$ on the buffer associated with $M_i$. An adversary seeks to solve as many client puzzles as possible subject to these constraints. Let $T=T_1+T_2 T_3$. It is easy to see that at a given point in time τ, there will correspond to each allocated buffer slot in B a solved client puzzle which was requested at the latest at time τ−T. Therefore, the maximum number of buffer slots an adversary can have allocated in B is bounded above by the number of client puzzles she can solve in time T. If b (b=A) buffer slots in B are devoted to defending against an adversary, the probability of success of attack of an adversary is bounded above probability that she can solve b puzzles in an interval of time T. We make the assumption that the adversary can request and receive solved puzzles instantaneously, and also submit solved puzzles instantaneously. Other, more important bounding assumptions are enumerated below.

Let us consider a scenario in which an entity seeks to perform a computation C in discrete time steps, starting with time step t=1. We define an optimal algorithm or strategy for a performing computation C in U time steps as follows. Let $c_t$ the state of the computation in time step t, and let $pr[(X,U,C)]$ be the probability that algorithm X completes computation C by time U. Algorithm X is optimal if for all algorithms Y and times t≤U, $pr[(X,U,C)|c_t, c_{t-1} \ldots c_1] \geq pr[(Y,U,C)|c_t, c_{t-1}, \ldots c_1]$. In other words, employing algorithm X yields the highest probability of success at any time irrespective of the history of the computation.

Finally, we let BF denote the brute force strategy for solving sub-puzzles. In this strategy, the adversary works on the (or an) unsolved sub-puzzle SP such that s(SP) is maximal. In particular, the adversary searches an arbitrary, unexamined solution to SP. Observe that if the adversary employs BF from the start, then BF means solving sub-puzzles in strict sequential order. In other words, the adversary requests a sub-puzzle, works on it until it is solved, and only then requests another puzzle.

A.2 Bounding Assumptions

We consider an adversary with limited computational resources seeking to attack a server over some interval of time U. The adversary can submit attempted puzzle solutions with variable solution levels. The adversary can, for instance, perform no computational effort, submit a random solution to P with solution level s(P)=0, and hope that it has guessed correctly. With this strategy, the adversary can submit many potential solutions in a short space of time, but few of these solutions are likely to be correct. Alternatively, the adversary may invest the full computational effort to solve puzzles completely, i.e., submit puzzles with solution level s(P)=m. With this strategy, the adversary is assured that its submitted solution to a given puzzle P is correct, but it can submit solutions to relatively few puzzles within a given space of time. There is, of course, also a continuum of intermediate levels of computational investment the adversary may make in submitting attempted puzzle solutions. For the purposes of simplifying our proof, we divide this continuum into two parts. Those solutions that the adversary submits to puzzles P with s(P)≤m/2 we refer to as short solutions. Solutions to such puzzles are short in the sense that the portion of the solution that is computed, rather than guessed at, is short. In contrast, we refer to solution such that s(P)>m/2 as long solutions. Such puzzles have a high solution level, i.e., most of the attempted solution has been worked out, rather than guessed at. Of course, we could partition the continuum of solution levels on a puzzle into more than two parts, but the classification into short and long solutions is sufficient for the purposes of our proof. Given this classification, we make use of the following bounding assumption to achieve an upper bound on the power of the adversary. This assumption is implicit throughout our proof.

Bounding assumption 1 If the adversary submits a short solution to a puzzle P (i.e., s(P)≤m/2), then we assume s(P)=m/2. (Thus, even if the adversary invests no computation in a solution, we assume that it has correctly solved m/2 sub-puzzles.) If the adversary submits a long solution to a puzzle P (i.e., s(P)>m/2), then we assume s(P)=m, i.e., that the adversary has solved the puzzle completely.

To simplify our proof further, we make two additional bounding assumptions. These assumptions likewise have the effect of yielding an upper bound on the power of on an adversary mounting an attack over a time interval of length U. We apply this next bounding assumption to long solutions, simplifying the task of the adversary in submitting such solutions.

Bounding assumption 2 We relax the requirement that sub-puzzles be grouped in puzzles. Instead, when the adversary must submit X long solutions in a given time interval, we assume that it is sufficient for the adversary simply to submit mX/2 correctly solved sub-puzzles of its choice.

Normally, to mount a successful attack over a period of time U against a buffer B, the adversary must submit at least b correctly solved puzzles. We partition the b slots devoted to the client puzzle protocol in buffer B into two buffers $B_1$ and $B_2$ with (arbitrary) sizes b/8 and 7b/8 respectively. We then render the task of the adversary easier as follows.

Bounding assumption 3 We allow the adversary to attempt the following two tasks, assuming that the adversary is successful if it performs either one successfully: (1) Fill buffer $B_1$ in time U by submitting enough correct short solutions, or (2) Fill buffer $B_2$ in time U by submitting enough long solutions. (Note that our use of Bounding Assumption 2 is such that we don't require long solutions to be correct to cause allocations in buffer $B_2$.)

A.3 Proof Outline

To summarize, then, we allow the adversary time U to try to fill buffer $B_1$ by means of short solutions and time U to try to fill buffer $B_2$ by means of long solutions. We show that short solutions are unlikely to be correct (Lemma 1). This leads us to show that the adversary has very low probability of successfully filling buffer $B_1$ (Lemma 4). For the adversary to fill buffer $B_2$ successfully, we relax the requirement that the adversary submit the required number of correct long solutions. Instead, under Bounding Assumption 2, we allow the adversary to submit an appropriate number of independent sub-puzzles. An adversary may seek to exploit variations in solution time of sub-puzzles—perhaps by means of a probabilistic strategy—to reduce the computational power it requires to mount a successful attack. We show, however, that the brute force algorithm (BF) is optimal for the adversary in solving independent sub-puzzles (Lemma 2). We show further that the time for BF to solve the necessary number of sub-puzzles is long enough so that it is very unlikely to adversary can do so in time U (Lemma 5). Since the adversary is likely to be able to fill neither buffer $B_1$ nor buffer $B_2$, we obtain our main theorem, Theorem 1, stating that the adversary is very unlikely to be able to mount a successful denial of service attack by overloading buffer B in a feasible interval of time U.

A.4 Proofs

We begin by showing that short solutions are, in general, unlikely to be correct.

Lemma 1 The probability that a short solution is correct is $\leq 2^{-km/2}$.

Proof: Suppose that $s(P[j])+s(P[j'])<2$. In other words, suppose that the adversary has not solved sub-puzzles P[j] and P[j'] completely. Let q be the probability that if the adversary guesses at a solution to P, it will guess correct solutions to P[j] and P[j']. It is straightforward to see that $q=1/(|S^*(P[j])| |S^*(P[j'])|)$. If $s(P[j])+s(P[j'])<1$, then $(|S^*(P[j])|+|S^*(P[j'])|)>2^k$. It is easy to show that q is maximized when $|S^*(P[j'])|=2^k$ and $|S^*(P[j])|$ is minimized, i.e., when $s(P[j])=s(P[j])+s(P[j'])$, and $s(P[j'])=0$. If $s(P[j])+s(P[j'])\geq 1$, then q is similarly maximized when $||S^*(P[j])||=1$, i.e., when $s(P[j])=1$. All of this is to say, in loose terms, that q is maximized when the search of the adversary has been concentrated as much as possible on one sub-puzzle. By a straightforward inductive argument, it follows that the probability that an adversary makes a correct guess on a puzzle P is maximized when the search of the adversary has been concentrated on as few sub-puzzles as possible. Call this probability $\tau$. The probability $\tau$ is maximized when $s(P[1])=s(P[2])=\ldots=s(P[\lfloor s(P)\rfloor])=1$ and $s(P[\lceil s(P)\rceil])=s(P)-\lfloor s(P)\rfloor)$. It is easy to show now that for any short solution, $\tau\leq 2^{-k(m-s(P))}$. The Lemma follows.

Observation 1 Let SP and SP' be two sub-puzzles. Let p be the probability that the adversary solves SP on the next step of work on that sub-puzzle, and p' be the probability that the adversary solves SP' on the next step of work on SP'. If $s(SP)\leq s(SP')$, the $p\leq p'$.

Proof: The probability that an adversary solves a unsolved sub-puzzle SP by working on it for one time step is $1/(|S^**SP)|)$, and thus increasing with respect to s(SP). The observation follows.

Observation 1 means that the work the adversary works on a sub-puzzle, the more it pays to continue to work on that sub-puzzle. This observation is crucial to our proofs, suggesting as it does that the optimal strategy for the adversary is to work on puzzles in a strictly sequential fashion. We proceed to prove that this is the case.

Lemma 2 Let $SP_1, SP_2, \ldots$ be a sequence of (partially solved) sub-puzzles, and $z\geq 0$. Then for any n, BF is an optimal algorithm for an adversary to achieve $\Sigma_i s(SP_i)\geq z$ in n time steps.

Proof: Let n be an arbitrary number of time steps, and let C denote computation achieving $\Sigma_i s(SP_i)\geq z$. Let H be the history of computation of all computation performed by the adversary on puzzles $SP_1, SP_2, \ldots$. Let c be the current state of computation. We shall prove inductively on j that for all Y, it is the case that $pr[(BF,j,C)|H]\geq pr[Y,j,C)|H]$. In other words, BF is optimal. Consider j=1. If the state of the computation c at this point is such that $\Sigma_i s(SP_i)\geq z-1/2^k$, then any algorithm which works on an unsolved sub-puzzle will complete computation C. If $\Sigma_i s(SP_i)\geq z-1/2^k$, then either C cannot be achieved, or else the only way that C can be achieved by time step n is for the adversary to solve an unsolved sub-puzzle in the next time step. Let us assume the latter. By Observation 1, the adversary maximizes its probability of achieving this by working on the unsolved sub-puzzle $SP_i$ such that $s(SP_i)$ is maximal. In other words, BF is optimal.

Let us assume inductively that BF is optimal for j<n, and now consider j=n. Let us refer to the first time step at this point as the initial time step. Let us denote by W(1) those unsolved sub-puzzles which have received the maximal amount of work prior to the initial time step, i.e., all unsolved sub-puzzles SP such that s(SP) is maximal among unsolved sub-puzzles. Let us denote by W(2) those unsolved sub-puzzles which have received the second largest quantity of work, etc. The algorithm BF would, in this initial time step, work on some sub-puzzle in W(1). Let us suppose instead that there is an optimal algorithm X which works on some sub-puzzle which has received less than the maximal amount of work, i.e., some sub-puzzle SP'∈W(z) for z>1. This, of course, either promotes SP' to W(z-1) or solves it. Let us regard the partitioning of sub-puzzles defined by W as frozen from this point on.

By induction, BF will be optimal after this time step, so we may assume that X runs BF for all of the n-1 remaining time steps. This means that the adversary is working on sub-puzzles in W(1), then sub-puzzles in W(2), etc. We can examine the progress of the adversary in these remaining steps in terms of two cases.

Case 1 The adversary never finishes W(z-1), i.e., doesn't solve all sub-puzzles in W(z-1). In this case, the adversary applies only one step of work to SP'. If the adversary had not worked on SP' in the initial time step, and had pursued algorithm BF instead of X, it would have been instead able to devote one more step of work to some puzzle SP in W(z-i) for some i≥1. In other words, the adversary could have worked on some puzzle SP such that $s(SP)\geq s(SP')$. By Observation 1, this would have meant at least as high a probability of success of completing computation C. Hence employing BF in the initial time step yields at least as high a probability of success as employing X.

Case 2: The adversary finished W(z-1). In this case, the adversary has merely shuffled the order of its work. The adversary has applied one initial step of work to SP', either solving SP' or promoting it to W(z-1). IF the adversary promoted SP' to W(z−1), then it subsequently applied w additional steps of work to complete SP'. In either case, if the adversary had instead not worked on SP' in the initial time step, leaving SP' in W(z), it would have reserved at least one extra step until after it had completed W(z−1). In this case it would have applied at least w+1 steps to a sub-puzzle in W(z), which we may assume, w.l.o.g. is SP'. Hence, in either case, SP'would have been solved (with the same amount of work, of course). Hence employing BF in the initial time step yields at least as high a probability of success as employing X.

The following corollary is now immediate.

Corollary 1 The optimal algorithm for computing a long solution to puzzle P is to apply BF to its component sub-puzzle until m/2 sub-puzzles are solved.

Corollary 1 would seem to imply that an optimal adversarial strategy for computing as many long solutions as possible in a given interval of time is to work on puzzles sequentially. This is not necessarily the case, however. Corollary 1 tells us that an optimal adversary will apply BF to the sub-puzzles in any given puzzle. A crafty adversary, however, might increase its efficiency by interleaving work on a number of puzzles, and concentrating more work on those puzzles on which it is making the best progress. Rather than attempting to analyze an adversary of this sort, we make use of the following, simple observation.

Observation 2 In order to submit z long solutions, an optimal adversary must correctly solve at least zm/2 sub-puzzles.

Observation 2 enables us to invoke Bounding Assumption 2 from above. Now, instead of requiring the adversary to submit z long solutions in a given space of time, we allow the adversary instead to submit zm/2 sub-puzzles. We permit the adversary to request and solve these sub-puzzles independently of one another.

As noted above, in order for an adversary to have b buffer slots allocated at a given time t, the adversary must have submitted correct solutions to at least b puzzles requested in the previous time interval T. Some of these solutions may be short, and some may be long. We bound the power of the adversary separately with respect to short and long. To do this, we invoke Bounding Assumption 3.

Recall that under Bounding Assumption 3, we partition the b slots in buffer B devoted to the client puzzle protocol into memory spaces $B_1$ and $B_2$. Buffer memory $B_1$ is reserved for the submission of correct short solutions. We allocate to $B_1$ (somewhat arbitrarily) a ⅛-fraction of the buffer slots b in B, i.e., the number of buffer slots in $B_1$ is equal to b/8. Buffer memory $B_2$ is reserved for the submission of long solutions. We allocate to $B_2$ the remaining 7b/8 buffer slots. In order to mount a successful attack, the adversary must overload either buffer $B_1$ or buffer $B_2$ (or both). We show that an adversary is unlikely to be able to do either.

We first require the following lemma, based on the Hoeffding inequalities presented in McDiarmid [15].

Lemma 3 (Hoeffding Inequalities) Let $X_1, X_2, \ldots, X_n$ be a set of independent, identically distributed random variable in [0,1], and let $X=\Sigma_i X_i$. Then:

$$pr[X-E[X] \geq \epsilon E[X]] \leq \exp(-1/3\epsilon^2 E[X]) \text{ and} \qquad 1.$$

$$pr[X-E[X] \leq -\epsilon E[X]] \leq \exp(-1/2\epsilon^2 E[X]). \qquad 2.$$

Let us first turn our attention to buffer $B_1$, then buffer devoted to correct short solutions. The following lemma states that if b is sufficiently large, then $p_{B1}$, the probability that the adversary mounts a successful attack against $B_1$, is small. In accordance with our notation above, let us denote by g the number of time steps per second for the adversary, i.e., the number of hashes per second the adversary can perform.

Lemma 4 Let us denote by $p_{B1}$, the probability that the adversary mounts an attach successfully on $B_1$, in time U. Then $P_{B1} \leq Ug(\exp(-1/3(b2^{(km/2)-3}/Tg-1)^2 Tg2^{-km/2})$.

Proof: By assumption, an adversary can submit at most Tg short solutions in an interval of time Tg. Let $X_i$ be a random variable equal to 1 if the $i^{th}$ short solution submitted by the adversary is correct, and 0 otherwise. Let $X=\Sigma_{i=i}^{Tg} X_i$. By Lemma 1, the probability that a short solution is correct is $\leq 2^{-km/2}$, hence $E[X]=Tg2^{-km/2}$. The attack on buffer memory $B_1$ is deemed successful if $X \geq b/8$. Thus the probability of a successful attack on $B_1$ is at most $pr[X-E[X] \geq b/8-E[X]]=pr[X-E[X] \geq b/(iE[X]-1))E[X]]=pr[X-E[X] \geq (b2^{km/2}/8Tg1)E[X]]$. By Lemma 3 (inequality (1)), then $p_{B1} \leq \exp(-1/3(b2^{(km/2)-3}/Tg-1)^2 Tg2^{-km/2})$. Since puzzle guess successes are independent of one another, the result follows by a union bound.

The proof of Lemma r relies on the fact that an adversary is unlikely to be able to guess solutions correctly. Lemma 5 treats the case of long solutions. Lemma 5 essentially expresses the fact that an adversary working on many long solutions is likely to take about the expected amount of time to do so.

Lemma 5 Let us denote by $p_{B2}$, the probability that the adversary mounts an attack successfully on $B_2$ in time U. Then $p_{B2}, \leq Ug(\exp(-(7bm/64)(1-Tg/(7bm^{2k-5}))^2))$.

Proof: In order to attack buffer memory $B_2$ successfully, the adversary must submit at least 7/8b correct long solutions. By Observation 2, this means that the adversary must submit at least 7bm/16 solved sub-puzzles. By Lemma 2, an optimal adversary will solve these sub-puzzles in strict, sequential order. Recall that the time to solve a sub-puzzle is a uniform random variable uniform on the interval of integers $[1,2^k]$ Let $X_i$ be a random variable denoting the time required to solve the $i^{th}$ sub-puzzle divided by $2^k$. Hence $X_i$ is uniform over [0, 1]. Let $X=\Sigma_i^{7bm/16} X_i$. Thus the time required for the adversary to solve the sub-puzzles is $2^k X$ steps, and $E[X]=7bm/32$. In order for the adversary's attack to be successful, therefore, it must be the case that $2^k X \leq Tg$. Now, by the Hoeffding inequality given in Lemma 3 (inequality (2)), $pr[2^k X \leq Tg]=pr[X \leq Tg2^{-k}]=pr[X-E[X] \leq -(1-Tg/(2^k E[X]))E[X]]$ is bounded above by $\exp(-1/2(1-Tg/2^k E[X]E])^2 E[X]])=\exp(-7bm/64)(1-Tg/(7bm2^k-5))^2)$.

Suppose that the adversary has been successful in overloading $B_2$ in time step t−1. Since the adversary submits at most one puzzle per time step, at most one puzzle can expire in any given time step, and hence only one of the buffer slots in $B_2$ will expire in time step t. Hence, the probability that the adversary is successful in overloading $B_2$ again in time step t is equal to the probability that it solves a new sub-puzzle in time step t, which is at least $2^{-k}$. This is more than the a priori probability that the adversary successfully overloads $B_2$ in time step t. In other words, the probability of success in time step t conditional on success in t−1 is greater than the a priori probability. It follows that the probability that the adversary overloads $B_2$ in time step t conditional on failure to overload $B_2$ in time step t−1 must be less than the a priori probability. Therefore the result follows by a union bound.

We can now bound the success probability of the adversary by combining Lemmas 4 and 5. This yields a somewhat complicated expression in the parameters b, k, m, T, g, and U, and implicitly on the ratio of the computing power of the adversary to that of clients. In particular, it is easy to see that a union bound yields the following.

Corollary 2 Let p be the probability that an adversary mounts a successful attack against the client puzzle protocol in U time steps. Then $p \leq Ug[\exp(-1/3(b2^{(km/2)-3}/Tg-1)^2 + \exp(-(7bm/64)(1-Tg/(7bm2^{k-5}))^2)]$.

In the interest of producing a simpler, if less general main theorem, we make the following three assumptions on the parameters in the expression of Corollary 2. These assumptions describe a conventional attack model and usage parameters.

1. The adversary has a total computing power of no more than $10^8$ MIPS. A time step is defined to be the time for the adversary to execute 400 instructions (i.e., one MD4 computation). It follows that the adversary executes no more than $2 \times 10^{11}$ time steps/sec, i.e., that $g \leq 2 \times 10^{11}$ 2. The adversary devotes no more than a year to mounting a connection depletion attack. (This combined with the previous assumption yields $Ug < 2^{63}$.)

3. Puzzles are constructed such that $m \geq 8$.

Finally, we use the average time required to solve a puzzle in order to parameterize the number b of buffer slots in B devoted to defending against adversarial attack. Since the expected time to solve a sub-puzzle is $2^{k-1}$ steps, and a puzzle contains m sub-puzzles, the number of buffer slots an adversary can force the server to allocate "on average" in time T is $Tg/(m2^{k-1})$. We let $c=b/(Tg/m2^{k-1})=bm2^{k-1}/Tg$. The variable c thus represents the ratio of the chosen buffer size to the buffer size we would expect an adversary to attack successfully on average.

Theorem 1 Assume an adversary with at most $10^8$ MIPS of computing power that mounts a connection depletion attack for no more than a year. Assume further that puzzles are constructed such that $m \geq 8$. Then if $c \geq 7/2$ and $b \geq 1100$, the probability of an adversary mounting a successful attack is less than $2^{-100}$.

Proof: Given the conditions $m \geq 8$, $c \geq 7/2$, and $b \geq 1100$, straightforward application of algebra to Lemma 4 shows that $p_{B1} \leq Uge^{-115}$ (in fact, $p_{B1}$ is substantially less than $Uge^{-115}$). Observe that appropriate substitution of c into the exponent in Lemma 5 yields $p_{B2} \leq Ug(\exp(-(7bm/64)(1-16/7c)^2))$. Therefore, when $c \geq 7/2$ and $b \geq 1100$, it is easily seen that $p_{B2} \leq Uge^{-115}$. By Corollary 2, we can bound the probability that the adversary mounts a successful attack by $p \leq 2Uge^{-115}$. By assumption $Ug < 2^{63}$. The theorem follows.

Remark Theorem 1 requires that $c \geq 7/2$ for the client puzzle protocol to be successful. In other words, the buffer B must be 7/2 times larger than we would expect to defend against an adversary with average success in solving client puzzles. By means of a more fine-grained analysis, it is possible to show that Theorem 1 holds for substantially smaller c. In fact, it holds for c slightly more than 1. Such detailed analysis, though, would result in a much longer proof.

Roughly speaking, there are two factors that enlarge the size of c required by Theorem 1. The first arises from Bounding Assumption 1: we assume that submitting any long solution to a puzzle (rather than a correct long solution) is sufficient to cause a buffer allocation in the server. This assumption enlarges c by about a factor of 2. The second factor arises from Bounding Assumption 3. Our division of B into buffers $B_1$ and $B_2$ in the proportion 1:7 enlarges c by a factor of about 8/7. (Hence, we would expect the exponent in Lemma 5, for instance, really to be close to (bm/4(1-1/c)).) The minimum buffer size b in Theorem 1 is subject to a similar enlargement due to our bounding assumptions. Rather than making direct use of Theorem 1, we recommend that designers of real-world client puzzle protocols make use of the following heuristic.

Heuristic 1 Assume an adversary with at most $10^8$ MIPS of computing power that mounts a connection depletion attack for no more than a year. Assume further that puzzles are constructed such that $m \geq 8$. Then if $c \geq 4/3$ and $b \geq 1100$, the probability of an adversary mounting a successful attack is less than $2^{-100}$.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for allocating a resource, comprising the steps of:
    (a) receiving a resource allocation request from a client;
    (b) imposing on said client a computational task and a time limit for correct completion of said computational task;
    (c) receiving verification that said client has correctly performed said computational task within said time limit; and
    (d) allocating said resource for said client if the verification is received;
    wherein said step (b) comprises communicating a puzzle as at least a portion of said communication task.

2. The method of claim 1 wherein said resource allocation request comprises a network connection request.

3. The method of claim 1 wherein said step (b) comprises communicating the output of a one-way function to said client.

4. The method of claim 1 wherein said step (b) comprises communicating the output of a block cipher to said client.

5. The method of claim 1 wherein said step (b) comprises communicating the output of a function, wherein the input of said function is generated, based at least in part on a server secret unknown to said client, and not revealed through correct performance of said computational task.

6. The method of claim 1 wherein said step (b) comprises communicating the output of a function, wherein the input of said function comprises a timestamp and information authenticating the timestamp.

7. The method of claim 1 wherein said step (b) comprises communicating a puzzle constructed in a self authenticating fashion.

8. The method of claim 1 wherein said step (b) comprises communicating a hash image and a partially revealed pre-image to said client.

9. The method of claim 8 wherein said step (c) comprises receiving the remaining pre-image.

10. The method of claim 1 wherein said step (b) comprises communicating a plurality of sub-puzzles to a client.

11. The method of claim 10 wherein said step (b) comprises communicating a plurality of independently constructed sub-puzzles.

12. The method of claim 10 wherein said step (b) comprises communicating a plurality of sub-puzzles wherein each sub-puzzle is constructed with an overlap of at least a portion of information that is common to two or more of the plurality of sub-puzzles.

13. The method of claim 1 wherein said step (a) comprises receiving a TCP SYN request.

14. The method of claim 1 wherein said step (a) comprises receiving a request to open an SSL connection.

15. The method of claim 1 wherein said step (b) comprises the steps of:
   (ba) determining if a computational task is to be imposed upon said client based upon the operating circumstances at the time of receiving said resource allocation request from said client; and
   (bb) if a computational task is determined to be imposed upon said client then selecting a computational task responsive to at least one characteristic of said operating circumstances at the time of receiving said resource allocation request; and
   (bc) if a computational task is determined to be imposed upon said client then imposing the selected computational task on said client.

16. The method of claim 1, wherein said step (a) comprises receiving a resource allocation request comprising a query, or accompanied or preceded by a query concerning whether a server is currently imposing computational tasks.

17. A method for procuring a resource comprising the steps of:
   (a) communicating a resource allocation request to a server;
   (b) receiving a computational task from said server;
   (c) performing or delegating the performance of said computational task correctly within a known time limit; and
   (d) communicating to said server a verification that said computational task has been performed correctly within the known time limit;
   wherein said step (b) comprises receiving said computational task and a time limit for performance of said computational task from said server.

18. The method of claim 17 wherein said resource allocation request comprises a network connection request.

19. The method of claim 17 wherein said step (c) comprises solving a puzzle.

20. The method of claim 19 wherein said step (c) comprises a linear search of the solution space associated with said computational task.

21. The method of claim 17 wherein said step (c) comprises solving a plurality of sub-puzzles.

22. The method of claim 17 wherein said step (a) comprises transmitting a TCP SYN request.

23. The method of claim 17 wherein said step (a) comprises transmitting a request to open an SSL connection.

24. The method of claim 17 wherein said step (a) comprises transmitting a resource allocation request comprising a query, or accompanied or preceded by a query concerning whether a server is currently imposing computational tasks.

25. An apparatus for allocating a resource comprising:
   a first receiver receiving a resource allocation request from a client;
   a computational task generator for imposing a computational task upon said client for correct performance within a time limit; and
   a transmitter communicating said computational task to said client;
   a second receiver receiving a verification from said client that said computational task was correctly performed with said time limit; and an allocator allocating said resource for said client;
   wherein said computational task comprises a puzzle.

26. The apparatus of claim 25 wherein said first receiver and said second receiver comprise the same receiver.

27. The apparatus of claim 25 wherein said first receiver receives a resource allocation request comprising a network connection request.

28. The apparatus of claim 25 wherein said transmitter communicates said computational task and a time limit for performance of said computational task to said client.

29. The apparatus of claim 25 wherein said puzzle comprises the output of a one-way function.

30. The apparatus of claim 25 wherein said puzzle comprises the output of a block cipher.

31. The apparatus of claim 25 wherein said puzzle comprises the output of a function, wherein the input of said function is based at least in part on a server secret unknown to said client and not revealed through correct performance of said computational task.

32. The apparatus of claim 25 wherein said puzzle comprises the output of a function, wherein the input of said function comprises a timestamp and information authenticating the timestamp.

33. The apparatus of claim 25 wherein said puzzle is constructed in a self authenticating fashion.

34. The apparatus of claim 25 wherein said puzzle comprises a hash image, and a partially revealed pre-image.

35. The apparatus of claim 34 wherein said verification comprises verifying the remaining unrevealed pre-image.

36. The apparatus of claim 25 wherein said puzzle comprises a plurality of sub-puzzles.

37. The apparatus of claim 36 wherein said plurality of sub-puzzles are constructed independently.

38. The apparatus of claim 36 wherein said plurality of sub-puzzles are constructed with an overlap of at least a portion of information that is common to two or more of the plurality of sub-puzzles.

39. The apparatus of claim 25 wherein said resource allocation request comprises a TCP SYN request.

40. The apparatus of claim 25 wherein said resource allocation request comprises a request to open an SSL connection.

41. The apparatus of claim 25 wherein said computational task is selected responsive to at least one characteristic of the operating circumstances at the time of receiving said resource allocation request.

42. The apparatus of claim 25 wherein said resource allocation request comprises a query, or is accompanied or preceded by a query concerning whether a server is currently imposing computational tasks.

43. The apparatus of claim 25 comprising a time limit generator generating a time limit within which said client must correctly perform said computational task.

44. An apparatus for procuring a resource comprising:
   a first transmitter communicating a resource allocation request to a server;
   a first receiver receiving a computational task from said server;
   a computational task solver correctly performing said computational task within a known time limit; and
   a second transmitter communicating to said server a verification that said computational task has been performed;

further comprising a second receiver receiving a time limit for performing said computational task.

45. The apparatus of claim 44 wherein said first transmitter and said second transmitter comprise the same transmitter.

46. The method of claim 44 wherein said first transmitter sends a resource allocation request comprising a network connection request.

47. The apparatus of claim 44 wherein said first receiver and said second receiver comprise the same receiver.

48. The apparatus of claim 44 wherein said computational task comprises a puzzle.

49. The apparatus of claim 44 wherein said computational task performs a linear search of potentially the entire solution space associated with said computational task.

50. The apparatus of claim 44 wherein said computational task comprises a plurality of sub-puzzles.

51. The apparatus of claim 50 wherein said sub-puzzles are constructed independently.

52. The apparatus of claim 50 wherein said sub-puzzles are constructed with an overlap of at least a portion of information that is common to two or more of the plurality of sub-puzzles.

53. The apparatus of claim 44 wherein said resource allocation request comprises a TCP SYN request.

54. The apparatus of claim 44 wherein said resource allocation request comprises a request to open an SSL connection.

55. The apparatus of claim 44 wherein said resource allocation request comprises a query, or is accompanied or preceded by a query concerning whether said server is currently imposing computational tasks.

* * * * *